United States Patent [19]

Schwartz

[11] Patent Number: 5,446,560
[45] Date of Patent: Aug. 29, 1995

[54] METHOD AND APPARATUS FOR RASTER TO BLOCK AND BLOCK TO RASTER PIXEL CONVERSION

[75] Inventor: Edward L. Schwartz, Sunnyvale, Calif.

[73] Assignees: Ricoh Company, Ltd, Tokyo, Japan; Ricoh Corporation, Menlo Park, Calif.

[21] Appl. No.: 60,948

[22] Filed: May 12, 1993

[51] Int. Cl.⁶ .......................................... G06K 15/00
[52] U.S. Cl. .................................... 358/445; 395/115
[58] Field of Search ............................ 382/44–47; 358/445, 426–427, 261.1–261.4; 395/115

[56] References Cited

U.S. PATENT DOCUMENTS

| | | | |
|---|---|---|---|
| 4,751,742 | 6/1988 | Meeker | 382/41 |
| 4,942,541 | 7/1990 | Hoel et al. | 395/115 |
| 5,136,688 | 8/1992 | Morikawa et al. | 395/115 |
| 5,218,670 | 6/1993 | Sodek, Jr. | 395/115 |

OTHER PUBLICATIONS

"CL550A JPEG Image Compression Processor", *C-Cube Microsystems*, C-Cube II, Preliminary Data Book, pp. 1-36 (Feb. 1990).

"CL550 JPEG Image Compression Processor", *C-Cube Microsystems*, C-Cube I, Product Brief (Mar. 1990).

"L64765 Color and Raster-Block Converter", *LSI Logic Corporation*, Pre-release Version, pp. 1-23 (May 15, 1991).

"L64765 Color and Raster-Block Converter", *LSI Logic Corporation*, Datasheet Errata (Aug. 8, 1991).

*Primary Examiner*—Stephen Brinich
*Attorney, Agent, or Firm*—Townsend and Townsend Khourie and Crew; Philip H. Albert

[57] ABSTRACT

A converter for reading image bands in block order and outputting the image bands in raster order or vice versa is provided, including a band memory for storing a number of pixels equal to the number of pixels in an image band, an array of counters coupled to an address input of the band memory, a carry signal router, and a state machine. The carry signal router routes the carry out lines of the counters to the carry in lines of the counters in a pattern where the counters are ordered from a most significant to a least significant and the carry signal router ensures that each of the carry out lines of each counter is coupled to the carry in lines of the next most significant counter, with the carry out line of the most significant counter being input to a state machine and the carry in line of the least significant counter being a clock or divided clock input. The state machine, when clocked by the carry out of the most significant counter, changes the ordering of the counters, according to whether the input data is to be converted from block-to-raster or raster-to-block ordering.

28 Claims, 12 Drawing Sheets

METHOD AND APPARATUS FOR RASTER TO BLOCK AND BLOCK TO RASTER PIXEL CONVERSION

COPYRIGHT NOTICE

A portion of the disclosure of this patent document contains material which is subject to copyright protection. The copyright owner has no objection to the xerographic reproduction by anyone of the patent document or the patent disclosure in exactly the form it appears in the Patent and Trademark Office patent file or records, but otherwise reserves all copyright rights whatsoever.

BACKGROUND OF THE INVENTION

The present invention relates to the field of digital image transport. More specifically, in one embodiment the present invention provides an improved means for converting the pixels of a digital image between a stream of pixels in raster order and a stream of pixels in block order, or vice versa.

The typical digitized image is represented by a set of pixel values, where each pixel value indicates the color of the image at one point in a two-dimensional grid covering the image. If the image is monochromatic, a pixel value indicates the intensity, from light to dark, of the image at the grid point for that pixel. If the image is a color image, a pixel value might comprise one component for luminance (Y), and two components for chrominance ($C_r$, $C_b$), or components in other color spaces such as CYMK (cyan-yellow-magenta-black), and RGB (red-green-blue), etc. The image can be viewed by displaying dots whose color or intensity depend on the pixel values on a physical display device (such as a television or printer) in positions corresponding to the grid points for those pixel values. If the pixels are presented by an image source to the display device in a particular order, the image source and the display device must agree on the pixel order. For example, a non-interlaced computer monitor accepts the pixels of the image to be displayed on the monitor in a specific order, namely raster order.

Raster order begins with the upper-left pixel of the image, followed by the pixels of the upper line of the image, from left to right, followed by the pixels of the second line of the image, from left to right, and so on, down to the right-most pixel of the bottom line of the image. Typically, the pixels of one image are immediately followed by the pixels of a following image. A standard for a stream of multiple images is described in "Coding of Moving Pictures and Associated Audio—for Digital Storage Media", by the MPEG (Moving Pictures Experts Group). One use for a stream of multiple images is to create a moving image such as that displayed on a television monitor.

The pixels of a digital image, instead of being presented by an image source to a raster-order display device, might be presented to digital video processors. In image terminology, an "image source" provides the image and an "image sink" uses the image. One operation performed by a video processor is the compression of an image. One standard for compression, JPEG (Joint Photographic Experts Group), first divides the image into blocks each containing a square of 8×8 pixels, and then sequentially compresses one block at a time. As is known in the art of image compression, compressing pixels a block at a time yields good compression ratios for most images. However, the blocking of pixels presents a problem where the images to be compressed are presented by the image source in raster order, as the video processor must store multiple raster lines of pixels until all the pixels of a block are received. Conversely, if an image is presented in block order, as would be expected at the output of a JPEG video decompressor, the pixel stream must be converted from a block order to a raster order if the image sink is a raster-order device. In the 8×8 block order, the upper-left pixel of the image is presented first, followed by the next seven pixels of the image's top row, left to right, as in the case of raster order. However, the eighth pixel is followed by the left-most 8 pixels of the second line. This pattern repeats down to the eighth row of the first block, and then the upper-left pixel of the second block (the ninth pixel from the left of the top line of the image) is the 65th pixel to be output in block order. Thus, the pixels of the first block are followed by the pixels of the second block to its right, in turn followed by the pixels in blocks to the right of the second block, until the right edge of the image is reached. This row of blocks defines one image band. The first image band is followed by a second image band, until the entire image is presented. For further background on reordering of pixels, see JPEG, "CD10918-1 Digital Compression and Coding of Continuous-Tone Still Images".

One converter for reordering a raster-ordered image into a block-ordered image reads the raster-ordered image into a two-dimensional array, one band at a time, loading each pixel into a memory location corresponding to that pixel's raster position. Once the entire band is loaded into the array (which has a capacity of at least a full band of pixels), the pixels are then read out of the memory in block order. This converter is not entirely practical where the raster-ordered pixels form a continuous stream and the block-ordered pixels must be output in a continuous stream, since there are large gaps in the output stream while the array is filling and large blockages of the input stream, since no input is accepted while the array is emptying.

A similar converter converts block-ordered images to raster-ordered images.

One solution to the gap problem is to use two band memories and alternate between them to keep up a continuous input and output. While one memory is being filled, the other is being emptied. When the memory being filled is full and the memory being emptied is empty, which should be at the same time, their roles are reversed. This is known as "ping-ponging" memories.

FIG. 1 shows such an reordering converter 10 which uses a two band memories to perform the reordering. Since raster-to-block and block-to-raster conversion are symmetrical, only one case, of a raster-to-block converter, are discussed here in detail.

Converter 10 comprises band memory 0 (16), band memory 1 (18), multiplexer 20, address generators 22, 24, and inverter 26. An input of converter 10 which carries an input stream of pixels in raster order is coupled to the data inputs of both band memories. A line carrying a state signal is coupled to a write enable input of band memory 0, and the line is also coupled to a write enable input of band memory 1, through inverter 26. The outputs of band memories 0, 1 are coupled to inputs of multiplexer 20, which has a select input controlled by the state signal. The address of band memory 0 is provided by address generator 22, while the address of band memory 1 is provided by address generator 24.

Address generators 22, 24 are clocked by a pixel clock, which is either a clock generated from the pixel stream or provided by another source which is synchronous with the pixel stream. Address generator 22 generates an address which dictates the location in band memory 0 which is read from and written to; address generator 24 generates the address of locations in band memory 1.

Initially, the state signal is set to a value of 0, indicating that the current state is state 0. In state 0, the state signal enables the writing of the input pixel stream into band memory 1, and multiplexer 20 outputs pixels from band memory 0. Thus, in state 0, band memory 1 fills with pixels, and band memory 0 empties. Once band memory 1 is full and band memory 0 is empty, the state changes to state 1.

In state 1, the reverse is true: the state signal enables the writing of the input pixel stream into band memory 0, and multiplexer 20 outputs pixels from band memory 1, causing band memory 0 to fill with pixels, and band memory 1 to empty. The reordering of pixels occurs when the sequence of addresses output by address generators 22, 24 form one sequence when a memory is being filled, and another sequence when a memory is being emptied.

For a raster-to-block converter, address generator 24 might generate an address sequence in raster order in state 0, and then in state 1, generate an address sequence which would read the pixels out of band memory 24 in block order. Address generator 22 operates similarly, but generates the raster order addresses in state 1, and the block-reordered address sequence in state 0. In this way, a continuous stream of pixels can be accepted into either band memory 0 or 1, and a continuous stream of pixels can be output from the band memory into which data is not being written.

While converter 10 successfully reorders pixels, it does so at a large cost of chip real estate. For example, with 8 pixel by 8 pixel blocks, a image width of 4096 pixels (512 blocks), and 8 bits (1 byte) of data representing each pixel, band memories 0, 1 require 64K (65536) bytes of RAM.

As the above discussion points out, an improved means for converting an image back and forth between block and raster orderings without using large amounts of memory is needed.

SUMMARY OF THE INVENTION

An improved block-to-raster and raster-to-block pixel reordering converter is provided by virtue of the present invention.

One embodiment of a converter according to the present invention reads image bands in raster order and outputs the image bands in block order and/or reads image bands in block order and outputs the image bands in raster order. A band memory is provided for storing a number of pixels equal to the number of pixels in an image band. An address generator comprises a counter array which is coupled to an address input of the band memory to sequence the band memory in the proper order. The "proper" order for address sequencing is an order such any given image band can be written into the band memory in the incoming order (raster or block) and output in the outgoing order. The counter array is incremented by a pixel clock, and some of the carry signals from the counters in the array are routed by carry signal routers, which route carry signals based on a state machine and the interconnections in the carry router.

The carry signal router connects the carry out lines and the carry in lines of the counters in the array to arrange the counters into a larger counter. The carry router routes the carry out signal of the most significant counter to a state machine and routes a clock or a divided clock to the carry input of the least significant counter. The state machine, when clocked by the carry out of the most significant counter, causes the state to change, and thereby causing the carry router to change the carry in and out connections of the counters in the array to change the sequence of addresses being output by the array of counters to the band memory. The particular settings of the state machine and the carry router determine whether the counters will cause a block-to-raster conversion or raster-to-block conversion.

In a first embodiment, the address generator causes the reordering of the input pixels where the width of the image band is an integer power of the height of each block. In one example, 8 pixel by 8 pixel blocks with an image band width of 4096 pixels (512 blocks) or 512 pixels (64 blocks) are reordered.

In a second embodiment, the address generator causes the reordering of the input pixels where the width of the image band is an integer power of a base number, and the height of each block is also an integer power of that base number. The two integer powers might or might not be different. In one example, 8 pixel by 8 pixel blocks with an image band width of 256 pixels (32 blocks) are reordered.

In a third embodiment, the address generator causes the reordering of the input pixels where the width of the image band is an integer multiple of the height of a block. In one example, 8 pixel by 8 pixel blocks with an image band width of 640 pixels (80 blocks) are reordered.

In an alternate embodiment, the sequencing of addresses is provided by a ROM in which the equivalent of the sequential outputs of an address generator is stored at sequential addresses in the ROM, where the address to the ROM is provided by a sequential counter.

In some embodiments, the pixels comprise color components and/or subsampled components, while in other embodiments monochrome images are reordered.

A further understanding of the nature and advantages of the inventions herein may be realized by reference to the remaining portions of the specification and the attached drawings.

BRIEF DESCRIPTION OF THE DRAWINGS

FIG. 12($b$) is a block diagram of a digital image decompression system which reorders pixels from a block order to a raster order after decompression;

FIG. 12($c$) is a block diagram of a digital image compression system which reorders pixels from a raster order to a block order before performing a block-based transform on the pixels; and FIG. 12($d$) is a block diagram of a digital image decompression system which reorders pixels from a block order to a raster order after performing a block-based transform on the pixels.

DESCRIPTION OF THE PREFERRED EMBODIMENTS

Figure 1:
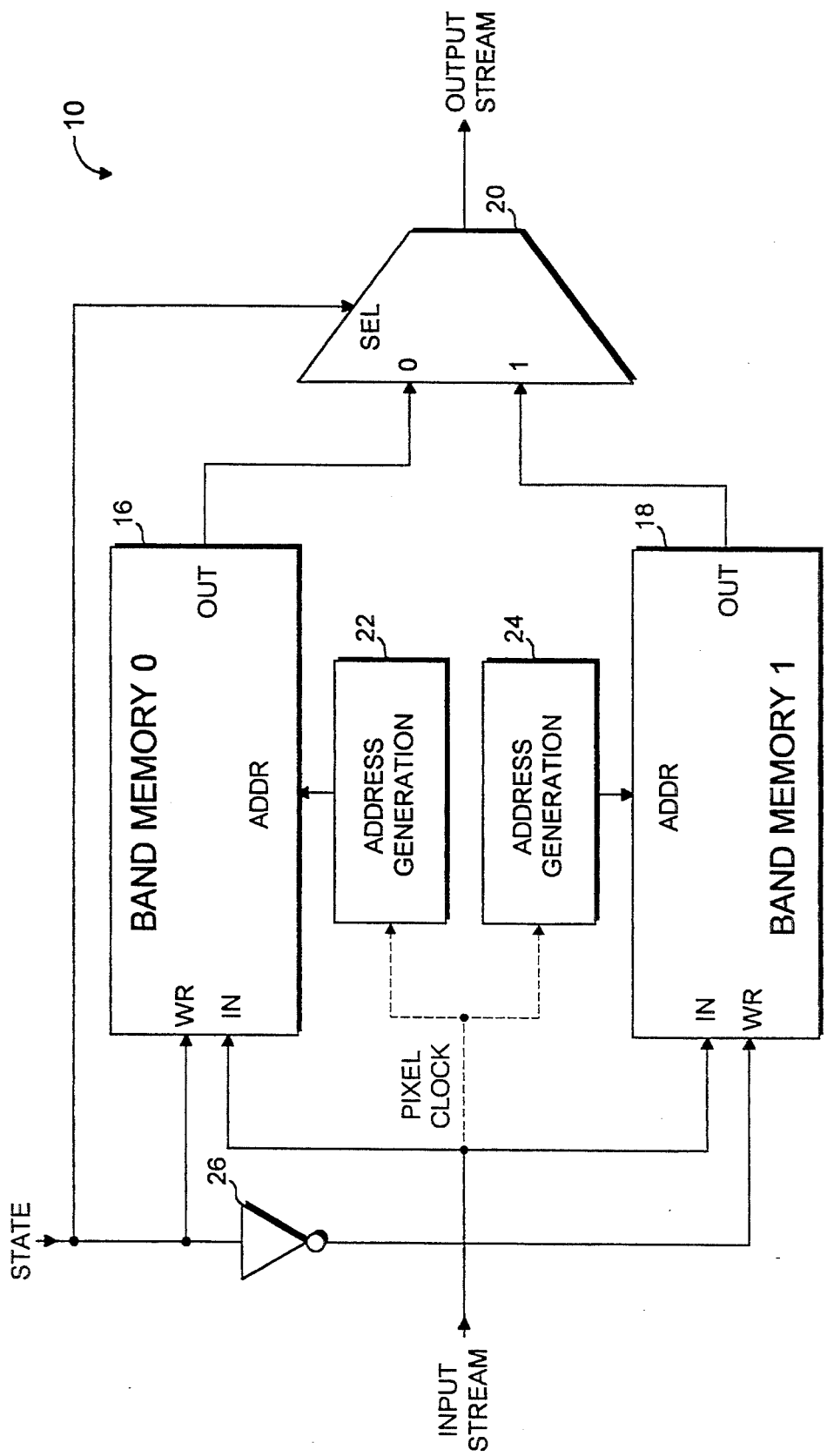
FIG. 1 is a block diagram of a typical two band memory pixel reordering converter.

The motivation for the present invention is to perform a raster-to-block (or block-to-raster) with only one band of memory. To do this, a "read-modify-write" memory operation is used for each pixel. One problem the present invention solves is the need for addresses generated in a sequence such that the pixels are read into and written out of the single band of memory in proper order. A band of the image is stored in the band of memory in an order different than an immediately previous image band, although the orders eventually repeat.

Throughout the following discussion, several naming conventions are used. Because the blocks of a block-ordered image are themselves arranged in a raster pattern, only one band, or row, of blocks need be processed at a time. Thus, the unit of operation, unless otherwise indicated, will by an image band, i.e., a span of blocks with a height of one block and a width equal to the width of the image. Accordingly, the number of bands comprising an image (indicating its height) is of little importance. While several examples of specific image widths and block sizes are presented, the present invention is by no means limited to those values for block size and image width.

To hint at the breath of possible values, the following notation is used. W is used to represent the width of the image band (which is also the width of the image) in blocks. The image band is always an integer number of blocks wide. B is used to represent the width of a block in pixels, and M is used to represent the height of a block in pixels. If B and M are equal, then a block is a square block of pixels. In some embodiments, N represents an integer, P represents an integer base number, and Q represents an integer base power. W, B, M, N, P, and Q can independently take on any positive integer value, as required by design criteria, although some values (such as M=0 or 1, B=0 or 1, etc.) lead to trivial or meaningless implementations.

Three embodiments are presented herein which show the trade-offs between hardware cost and flexibility in the choice of W, the width of the image bands. The least hardware cost of these three embodiments is achieved using the first embodiment, wherein the number of blocks per band is a power of the height of the band (i.e., $W=M^N$ blocks, for some M and N).

In the second embodiment, more flexibility is provided in the selection of the width of the image band, at the expense of more hardware, in some cases. The added flexibility allows for image widths (in blocks) to be any power of the height of the band, as well as widths (in blocks) which are any integer power of any base number of which the height is also an integer power (i.e., $W=p^N$ blocks, where $M=P^Q$ pixels, for some P, N, and Q).

In the third embodiment, even more flexibility is provided at the expense of even more hardware. In the third embodiment, the number of blocks in the image band can be any multiple of the height of the band (i.e., $W=M \times N$, for some M and N).

These three embodiments will be presented for the case where monochrome images are being manipulated, and then the general case will be extended to address color images with and without subsampling.

In some discussions, for brevity, only one direction of conversion, such as raster-to-block, is covered. However, because of the inherent symmetry of raster-to-block and block-to-raster conversion, wherever only one direction of conversion is discussed, the discussion also applies to the other direction. The term "reordering converter" is used throughout this description to refer to a converter which converts from a block order to a raster order, from a raster order to a block order, or a converter which can perform either conversion depending on a control setting or switch.

Figure 2:
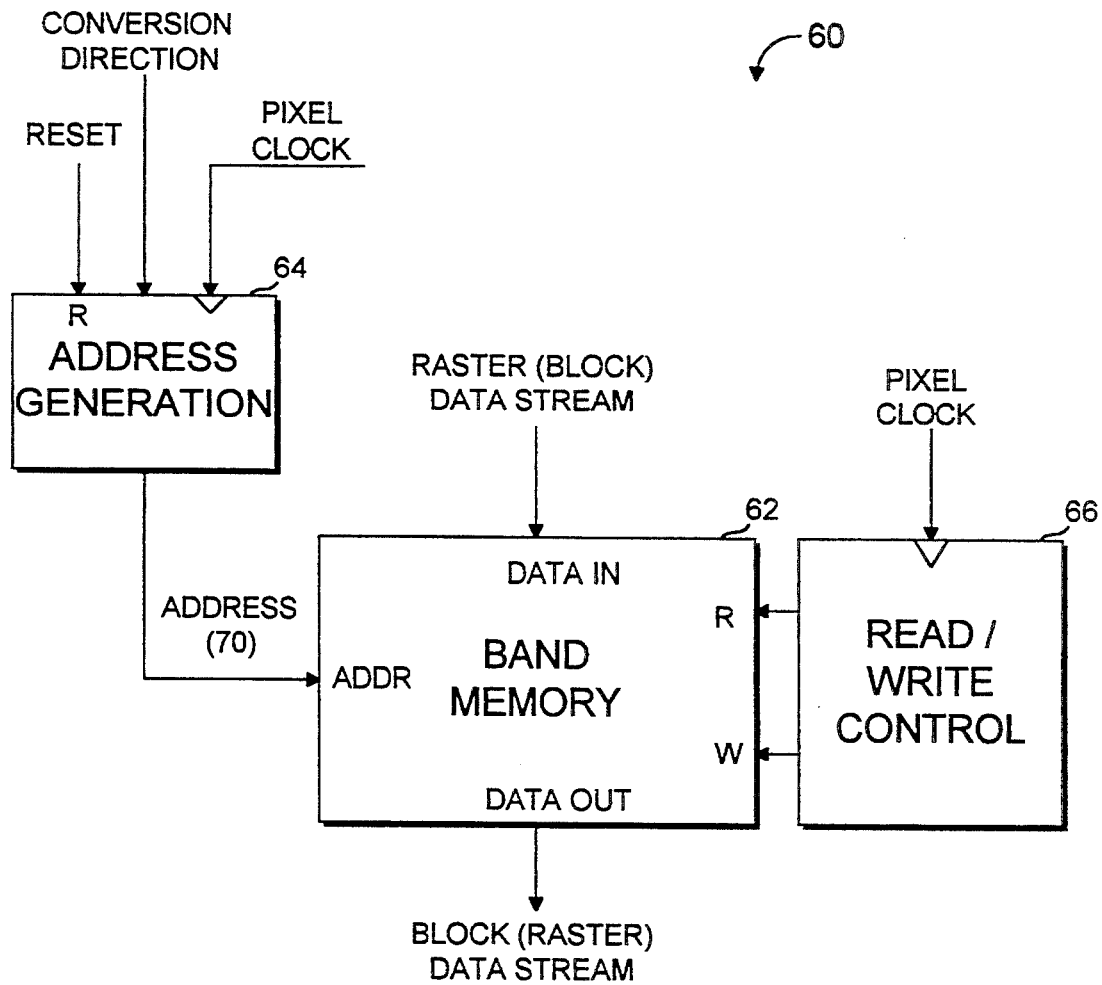
FIG. 2 is a block diagram of one embodiment of a reordering converter according to the present invention, including an address generator and a band memory.

FIG. 2 is a block diagram of a reordering converter 60 which converts pixels from either a block-to-raster order or a raster-to-block order. Suppose converter 60 is used for raster-to-block conversion. Converter 60 comprises a band memory 62 for storing input pixels received in raster order until they are output in a block order, and an address generator 64, the details of which are discussed in connection with other figures. Band memory 62 has a pixel input for receiving an raster-ordered stream of pixels, and a pixel output on which a stream of pixels in block order is output. Address generator 64 has a pixel clock input to time the input of each pixel, a reset input to reset internal counters and registers to a known initial state, a conversion direction input, and an address output coupled to the address input of band memory 62 over an address bus 70.

A pixel clock signal, a reset signal, and a conversion direction signal are applied to the pixel clock input, the reset input, and the conversion direction input, respectively, of address generator 64. The pixel clock signal is also applied to a clock input of a read/write controller 66, which has outputs coupled to a read control input and a write control input of band memory 62. In some embodiments, the pixel clock and reset signals are derived from the image data being input, and in embodiments implemented in software, the pixel clock might be a virtual clock. In the following discussion, a convention is followed where the reset signal is a logical signal which is logical 1 during a reset and logical 0 at all other times, and the conversion (reordering) direction signal is a logical signal which is logical 0 for a block-to-raster conversion and logical 1 for raster-to-block conversion.

Address generator 64 generates a stream of addresses to band memory 62, where the particular order of the addresses in the stream cause the pixels to be reordered. Each tick of the pixel clock, one pixel is output from band memory 62, and one pixel from the input of reordering converter 60 is placed in band memory 62. However, after the first image band to be processed fills band memory 62, the only place to store an incoming pixel is in the band memory location just vacated by the outgoing pixel. Read/write controller 66, by manipulating the read and write control lines of band memory 62, ensures that a pixel is read from band memory 62 and output before a new input pixel is placed in that location.

Because the address supplied by address generator 64 does not change during this read-then-write cycle, the output pixel and the input pixel use the same address. Of course, since converter 60 is a reordering converter, the sequence of the addresses appearing at the address output of address generator 64 is not the same from image band to image band, because if it were, the pixels would be output in the same order they were input. However, the particular sequence of addresses output by address generator 64 is determined in part by the number of blocks in a band, W, the width of a block, B, and the height of a block, M. Three classes of address generators are discussed below, each applicable to a set of W and M choices (although for some W and M, more than one class of address generator could be used).

Regardless of the pixel ordering, the first pixel in the order is the upper-left corner pixel of the image band, and the last pixel in the order is the lower-right corner pixel of the image band. As will become apparent, the address sequence pattern changes (in the non-trivial cases) from one image band to the next, following the last pixel in the image band, but the patterns eventually repeat. The particular pattern can be identified with a state, and state 0 is arbitrarily selected to be the state of an address generator when it is reading the first image band following a reset (i.e., when the reset signal goes from 1 to 0).

Class 1: B (wide)$\times$M (high) pixels/block; W=$M^N$ blocks

This first embodiment of an address generator is used in a reordering converter where the width of the image in blocks, W, is an integer power of the height, M, of a block. A specific example of an address generator will now be described in conjunction with FIGS. 3 and 4. This address generator is used in a raster-to-block reordering converter which reorders images having a block size of B=8$\times$M=8 and an image width, W, of either 512 ($8^3$) or 64 ($8^2$) blocks (4096 and 512 pixels, respectively) per image band.

Figure 3:
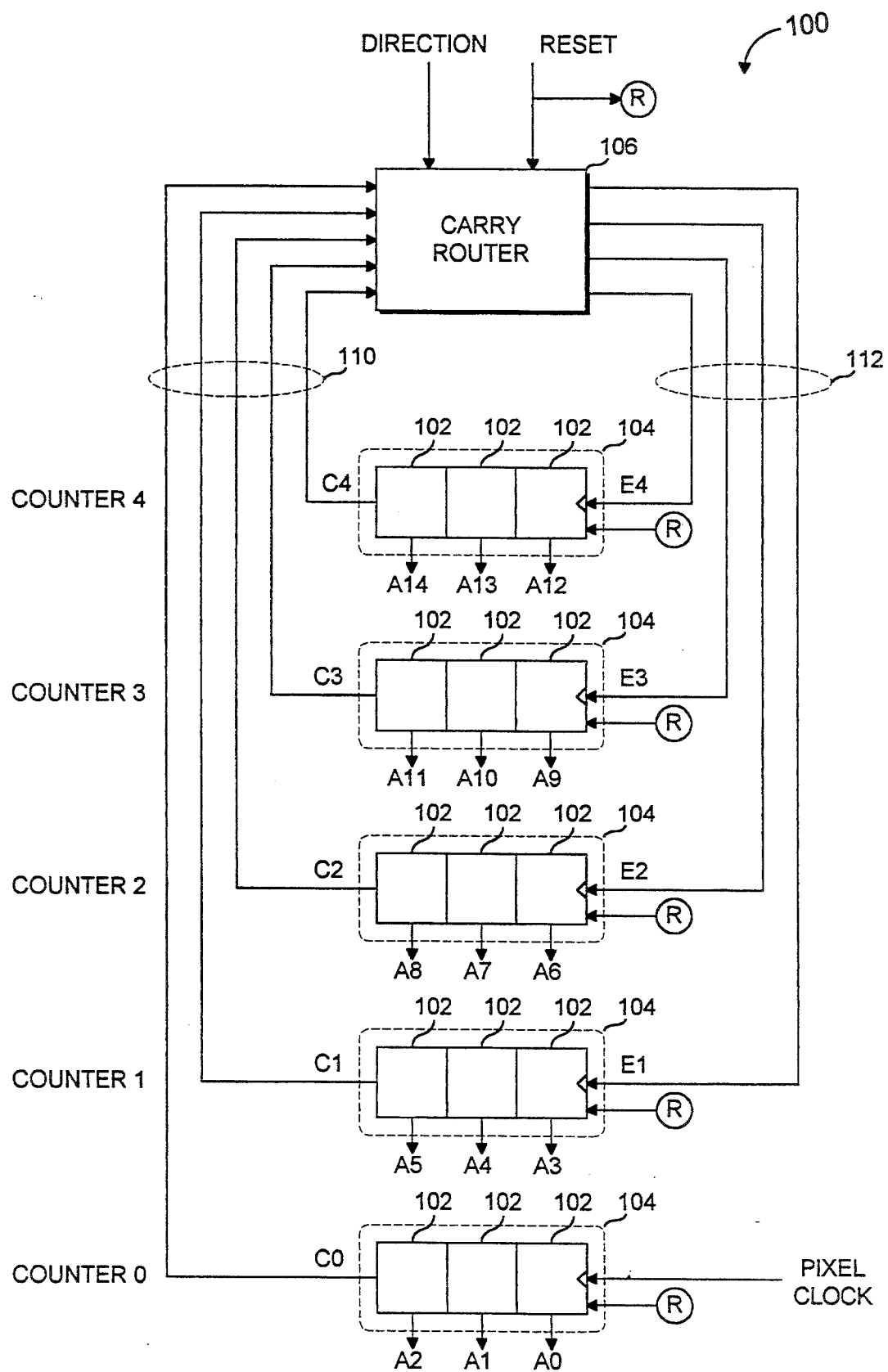
FIG. 3 is a block diagram of a first embodiment of an address generator, including a carry router used therein.

FIG. 3 is a block diagram of an address generator 100, as might be used in converter 60 to reorder pixels in image bands with a width of 512 blocks, with 8$\times$8 blocks. Address generator 100 comprises five counters 104 (numbered 0–4) capable of counting from 0 to 7, and a carry router 106. The carry outputs of counters 0–4 (labelled C0–C4) are provided to carry router 106 over carry out bus 110. The count inputs of counters 1–4 (labelled E1–E4) are coupled to receive outputs from carry router 106 over count enable bus 112. The count input of counter 0 is the pixel clock. Each counter 104 is reset when the reset signal is asserted. The reset signal and the conversion direction signal are provided to carry router 106.

Since M=8, each counter 104 is easily implemented by three bit-counters 102, where a counter 104 counts up by one for each count at a count input of counter 104 (or a count input of the least significant bit-counter 102 of counter 104), outputs the current count (modulo-8) on three bit lines, and outputs a carry signal on the transition from 7 to 0. As shown in FIG. 3, five counters 104 provide a total of 15 bit-counters 102, which can address each of the $2^{15}$ (32768) pixels in the image band (width of 4096 pixels$\times$8 pixels high). These address lines are labelled $A_{14}$ to $A_0$, and are provided to a band memory such as band memory 62. Because of the particular interconnections of carry outputs C4–C0 from bus 110 to the count inputs E4–E1 on bus 112, the sequence of addresses output on lines $A_{14}$–$A_0$ are such that a proper reordering is performed.

Depending on the implementation, a signal asserted on a count input of a counter 104 will increment that counter when asserted, or will enable the incrementing of the counter synchronous with the pixel clock.

To generate the proper sequence of addresses to be applied to a band memory, carry router 106 forwards four of the five carry signals C0–C4 to the four count inputs E1–E4, and the remaining carry out signal indicates the end of an image band. If the carry coupling is:

C0→E1, C1→E2, C2→E3, C3→E4, then address generator 100 will output addresses from 0 to 32767 in numerical order over address lines $A_{14}$–$A_0$, and a carry from $A_{14}$ will indicate the end of an image band. This is the initial coupling in state 0 (the current state is provided within carry router 106, as discussed below). As will be shown, the carry signal C4, when asserted causes a change of state, which is proper since C4 is asserted only after the first image band has been completely read in (after 32768 "ticks" of the pixel clock).

Of course, in other embodiments, where B or M are other than eight, counters 104 would not all be modulo-8 counters: counter 0 would be a modulo-B counter, and counters 1–4 would be modulo-M counters. In this example, N=3, however, for other values of N, the function of counters 1–4 are provided by N+1 modulo-M counters.

Figure 4:
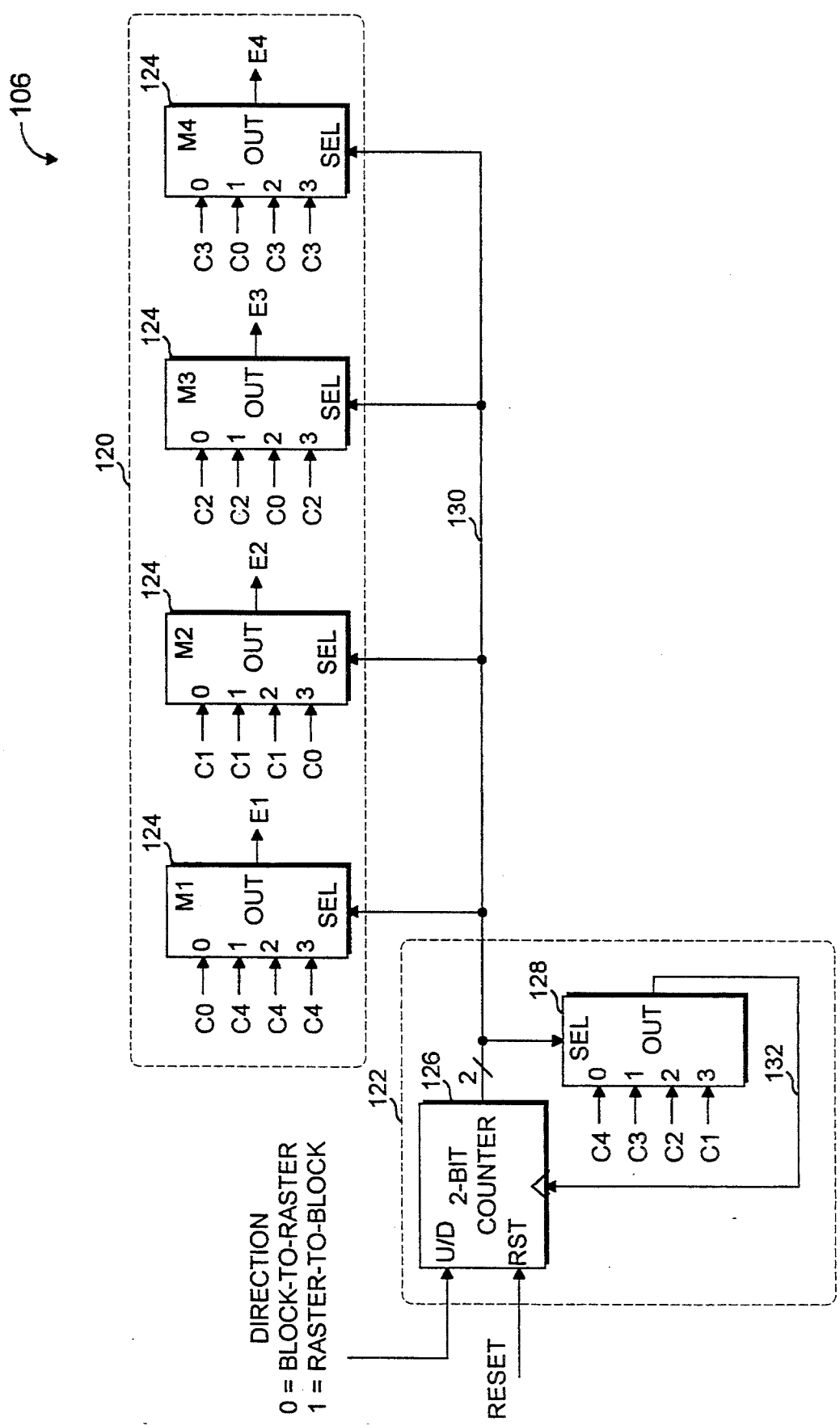
FIG. 4 is a block diagram of the carry router used in the address generator shown in FIG. 3.

FIG. 4 is block diagram of carry router 106. Carry router 106 comprises a multiplexer array 120 and a state machine 122. Multiplexer array 120, in this example, comprises four multiplexers 124 (M1, M2, M3, M4), and state machine 122 comprises a two-bit counter 126 and a multiplexer 128. Each of the multiplexers are one-of-four multiplexers, with multiplexer select inputs coupled to a state output of counter 126, over a state bus 130. The connections to the five multiplexers are such that each input of C0–C4 is either output as one of E1–E4, or is the output of multiplexer 128, which is provided via a signal line 132 to the clocking input of counter 126. The reset input to carry router 106 is coupled to a reset input of counter 126, and the conversion direction signal is coupled to an UP/DOWN# input to counter 126.

As previously mentioned, the multiplexers 124, 128 each output a selected one of their inputs, where the selection is determined by the "state" of counter 126. Since the E1–E4 outputs will determine the sequence which counters 1–4 (see FIG. 3) will follow, the particular connections of the inputs of the multiplexers determines the sequence of addresses output by address generator 100. The outputs of multiplexers M1–M4 are coupled to E1–E4, respectively, and the inputs to multiplexers M1–M4 are as shown in Table 1.

TABLE 1

| State | Multiplexer Inputs for Carry Router 106 | | | | |
| --- | --- | --- | --- | --- | --- |
| | M1 | M2 | M3 | M4 | Line 132 |
| 0 | C0 | C1 | C2 | C3 | C4 |
| 1 | C4 | C1 | C2 | C0 | C3 |
| 2 | C4 | C1 | C0 | C3 | C2 |
| 3 | C4 | C0 | C2 | C3 | C1 |

The generation of address sequences following a reset will now be described in conjunction with FIG. 4.

After a reset, counter 126 indicates that the state is state 0. In state 0, the SELECT input of each multiplexer 124, 128 is 0, so they all pass their "0" inputs to their outputs, resulting in carry outputs C0–C4 being routed as follows: C0→E1, C1→E2, C2→E3, C3→E4, with C4 routed to the clock of counter 126. In state 0, counters 104 count sequentially up, until C4 is asserted, which is at the end of an image band. Because carry output C4 is input to the clock input of counter 126, it causes the transition from state 0 to state 1. In state 1, the carries are routed as:

C4→E1, C1→E2, C2→E3, C0→E4, with C3 routed to the clock input of counter 126. This pattern changes as the state changes, and repeats with state 0 following state 3. This example is for raster-to-block conversion (direction=1). For block-to-raster conversion, the conversion direction signal is 0, and counter 126 changes from state 0 to state 3, then to state 2, state 1, and back to state 0. In this way, the proper address sequences for either raster-to-block or block-to-raster conversions are generated.

In effect, the addresses generated in state 0 are sequential, and the addresses generated in state 1 are such that the first row of pixels in the first block are addressed, followed by the second row of pixels in the first block. Because the pixels were read in with a raster order, the second row of pixels in the first block is found by incrementing the most significant modulo-M counter 104. This effect is provided in state 1, by tying the carry output C0 to the count input of counter 4. Counter 0, in essence, tracks the position of the current pixel within one row of pixels in a block, and while the order of the rows changes, the order of the pixels in a row is the same for both raster order and block order. Consequently, the count input to counter 0 does not change with the state of the address generator.

Carry router 106 shown in FIG. 4 is for N=3 and can convert in either direction. However, carry router 106 can be easily modified for an application in which only conversion in one direction is needed, by eliminating the UP/DOWN# input, or by tying the input to a specific value. Carry router 106 can also be modified for other values of N, with multiplexer array 120 having N+1 multiplexers and counter 126 having N+1 states.

For example, if N=2 (image width, W, of 64 blocks), then multiplexer array 120 would comprise 3 multiplexers, and counter 126 would cycle through states 0-1-2-0-1-2, etc., for a raster-to-block reordering and states 2-1-0-2-1-0, etc., for block-to-raster reordering. Each multiplexer 124 would need only three inputs, one for each of the three possible states. Table 2 shows the connections to those three inputs.

TABLE 2

| State | Multiplexer Inputs for Carry Router (Image width: 64 blocks) | | | |
| --- | --- | --- | --- | --- |
| | M1 | M2 | M3 | Line 132 |
| 0 | C0 | C1 | C2 | C3 |
| 1 | C3 | C1 | C0 | C2 |
| 2 | C3 | C0 | C2 | C1 |

As with the case of N=3, the N=2 converter is a raster-to-block converter if the state counter counts up, and a block-to-raster converter if the state counter counts down. As should be apparent, a converter for N=1 is the same for both conversion directions, since the counter only counts two different states. It should also be apparent that, for different image widths, the size of the band memory required is different. Such a reordering Converter has application in a typical video processing system in which images have a width of 512 pixels.

A reordering converter for reordering pixels from a raster-to-block order or from a block-to-raster order using an address generator with routable carry inputs and outputs and only one band memory has now been described. Such a converter is useful in image processing systems which use a block size of B pixels wide and M pixels high, and where the width of the image in blocks is an integral power of M.

The address generator shown in FIGS. 3 and 4 can also be modified for blocks of sizes other than 8×8, such as a block size of 16×16, by modifying counters 104 to be modulo-16 counters, i.e., four-bit counters. For 10×10 blocks, counters 104 would be 4-bit BCD counters (binary-coded decimal) or decimal counters.

Class 2: B×M pixels/block; $W=p^N$ blocks, $M=P^Q$ pixels

This second embodiment of an address generator is used in a reordering converter where the width of the image in blocks, W, is an integer power, N, of a base number, P, and the height, M, of a block, is an integer power, Q, of the base number. A specific example of an address generator will now be described in conjunction with FIGS. 5–7. The address generator shown is used in a reordering converter with B=8, P=2, N=5, and Q=3 (block size of 8×8 pixels, $M=2^3=8$, $W=2^5=32$ blocks, or 256 pixels).

Figure 5:
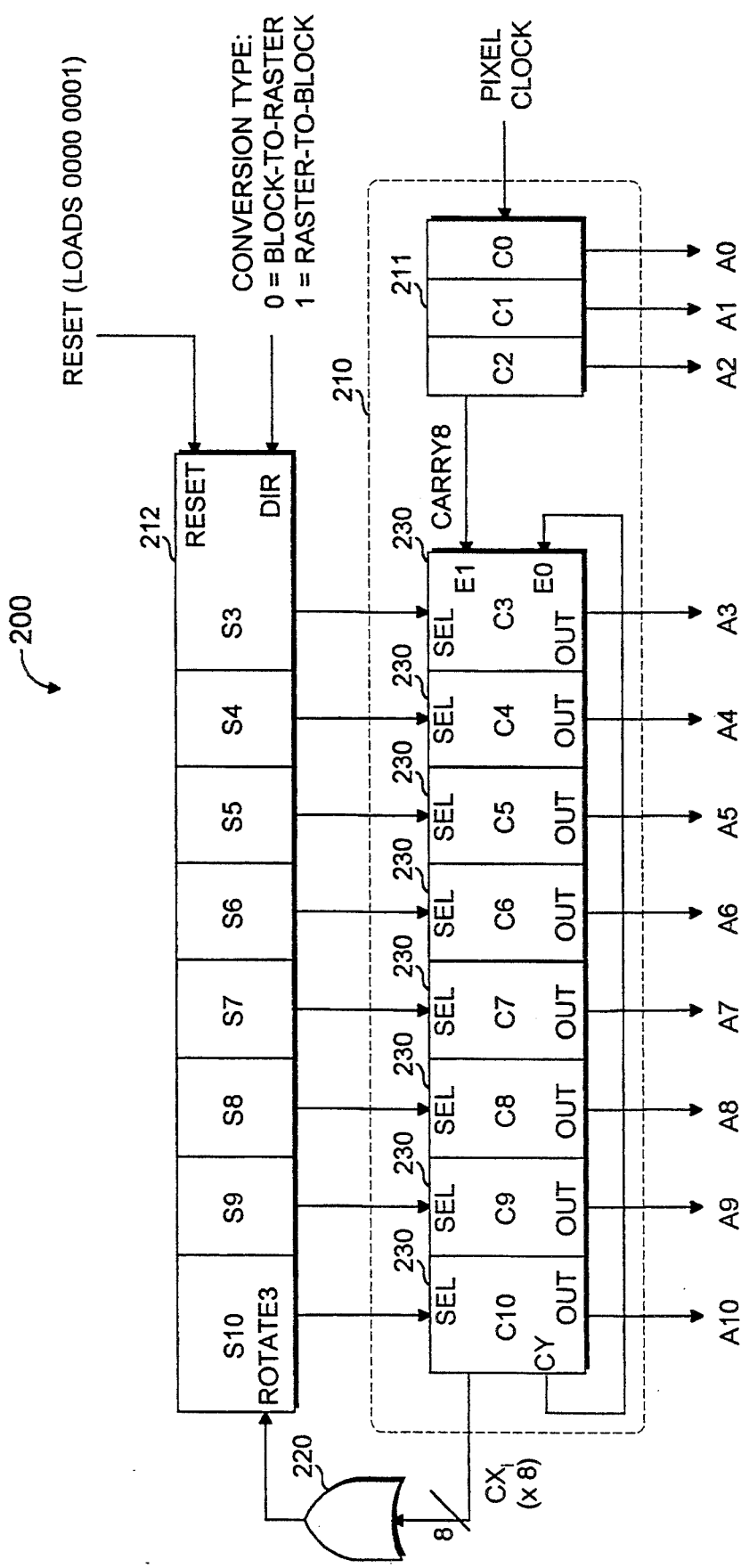
FIG. 5 is a block diagram of a second embodiment of an address generator, including a carry register and a counter array used therein.

FIG. 5 is a block diagram of an address generator 200, as might be used in converter 60 to reorder pixels in image bands with a width of 32 blocks and 8 pixels×8 pixels per block.

Address generator 200 comprises an array 210 of 8 counter units 230 and a modulo-8 counter 211. Counter units 230 are modulo-2, or bit, counters, and are similar to the individual bit counters of counter 211 with additional logic as discussed below. Each counter 211, 230 is shown labelled from counter C10 to counter C0, corresponding to address outputs $A_{10}$ to $A_0$. Address generator 200 also includes an eight-bit rotate-by-3 carry routing register 212, with carry routing register cells shown labelled from S10 to S3. One counter unit 230 is shown in greater detail in FIG. 7. Counter 211 is clocked by the pixel clock, and outputs a CARRY8 signal as a carry signal.

Counter array 210 acts as a sequential up counter, with the carry of each bit counter enabling a count input of the counter to its left (C3 is effectively to the "left" of C10, which is effectively to the "right" of C3), with one of the carry outputs of counter units 230 routed to carry routing register 212, and the carry input of the next higher counter in the array supplied with the CARRY8 signal. Carry routing register 212 determines which carry is rerouted, using the SEL inputs of each counter C10–C3. Each counter unit 230, in addition to the SEL input and an address output shown, has a CY output, a CX output, an E0 input, and an E1 input. Because C10 and C3 are considered adjacent, C10–C3 form a "circularly-ordered" set of counters, i.e., a finite number of counters each having one counter in the set to the right, and one counter in the set to the left. The application of these inputs and outputs will become clearer in the discussion accompanying FIG. 7.

The contents of register 212 is always seven logical "0"s and one logical "1", but the position of the "1" changes depending on the state of the address generator, which is state 0 after a reset, by convention. A reset signal causes the "1" to appear in the S3 cell for the duration of state 0. Because register 212 is a rotate-by-3 counter, in subsequent states, the "1" moves three cells to the left or right at each state transition. A state transition is caused by the output of OR gate 220 being true. The direction the "1" rotates at a state transition is determined by the value at a conversion direction input: a value of 0, indicating a block-to-raster conversion, causes the "1" to rotate three cells to the left, while a value of 1, indicating a raster-to-block conversion, causes the "1" to rotate three cells to the right.

In state 0, the "1" in cell S3 is applied to the SEL input of counter C3, causing the count input to counter C3 to be coupled to the CARRY8 signal, which is the carry output of C2. When a "0" is applied to the SEL input of C3, its count input is coupled to the carry output of C10. Instead, when S3=1, the carry output of C10 is routed to the ROTATE3 input of register 212, as is explained below. The SEL inputs of each of the other counters C10–C4 are "0", so their carry outputs (except for C10) are coupled to the count inputs of the counter to the left. Once C10 asserts its carry output, the state transition occurs, and register 212 applies the "1" to the SEL input of a different counter unit 230.

Figure 6:
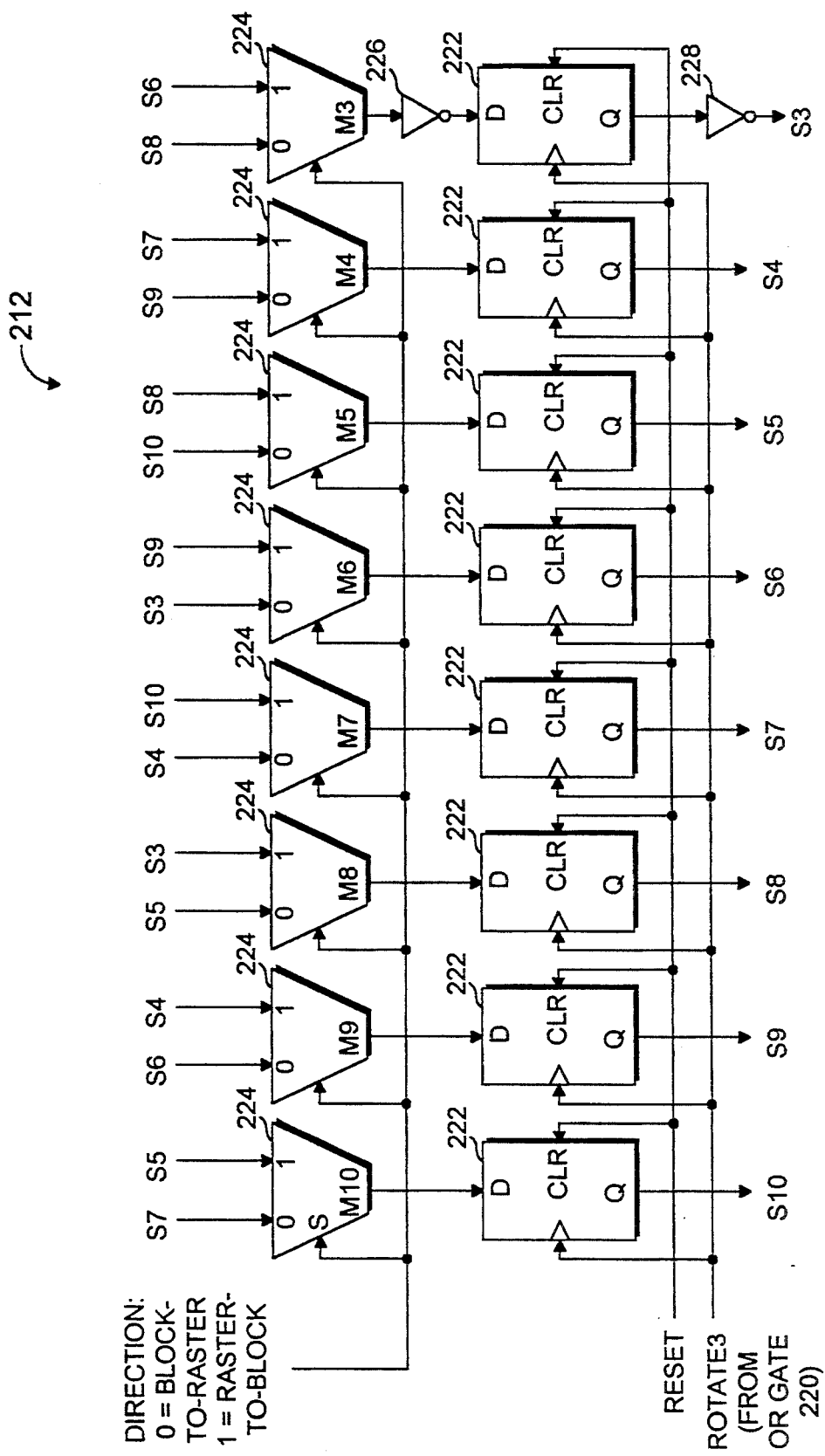
FIG. 6 is a block diagram of the carry register shown in FIG. 5.

FIG. 6 is a block diagram of register 212 showing more detail. As shown, each output of $S_{10}$–$S_3$ is the output of one of eight data latches 222(0 . . . 7), whose inputs are each coupled to an output of a multiplexer 224(0 . . . 7). Each of the data latches 222(0 . . . 7) is cleared by the reset signal and clocked by the ROTATE3 signal. Each multiplexer 224(0 . . . 7) has two inputs, one of which is selected at the output of the multiplexer based on the value of the conversion direction signal. The inputs to multiplexers 224(0 . . . 7) are as follows:

TABLE 3

| Direction | Multiplexer 224 Inputs Within Register 212 | | | | | | | |
|---|---|---|---|---|---|---|---|---|
| | M10 | M9 | M8 | M7 | M6 | M5 | M4 | M3 |
| Block→Raster (0) | S7 | S6 | S5 | S4 | S3 | S10 | S9 | S8 |
| Raster→Block (1) | S5 | S4 | S3 | S10 | S9 | S8 | S7 | S6 |

Two inverters 226, 228 are also provided, so that when the reset signal clears data latches 224(0 . . . 7), the contents of data latch 224(0) appears externally as a one.

Figure 7:
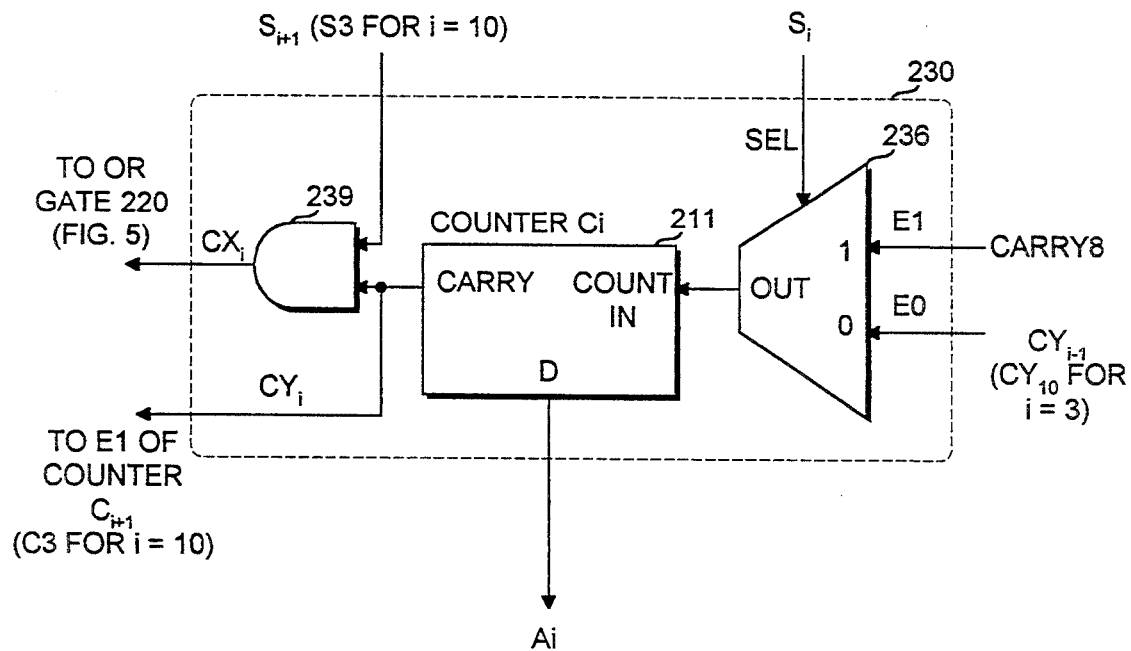
FIG. 7 is a block diagram of one exemplary counter from the counter array shown in FIG. 5, including auxiliary circuitry associated with each counter.

FIG. 7 shows a counter unit 230 in more detail. While counters 211 A2–A0 form a simple modulo-8 counter, counter unit 230 includes additional logic to provide for the rerouting of its carry signal. As shown in FIG. 7, counter unit 230 is an "i"th counter in array 210, where i=3 to 10. As mentioned above, counter unit 230 has a SEL input, two carry outputs, CX and CY, two enable (or count) inputs E0 and E1, and a bit value output OUT, which forms the "i"th bit of the address output by address generator 200. The E0 input is coupled to receive the CY carry output of the previous bit counter, counter "i−1" (C10 in the case of i=3), and the E1 input is coupled to receive the CARRY8 signal from counter 211. The E0 and E1 signals are inputs to a 2:1 multiplexer 236. The $S_i$ signal is coupled to the SEL input of counter unit 230, which is coupled to the select input of multiplexer 236. The output of multiplexer 236 is coupled to the count input of counter 211. The carry output of counter 211 is output as the signal CY, and is an input to an AND gate 239. A second input to AND gate 239 is the SEL input for the "i"th+1 counter unit (C3 for i=10), and the output of AND gate 239 is the CX output for counter unit 230.

Counter unit 230 operates as follows. When the SEL input to counter unit 230 ($S_i$) is 1, the CARRY8 signal at the E1 input is coupled to the count input of counter 211, thereby allowing counter 211 to be incremented when the CARRY8 signal is asserted. In some embodiments, an asserted carry is indicated by a pulse on the carry line. When the SEL input to counter unit 230 is 0, the $CY_{i-1}$ signal at the E0 input is coupled to the count input of counter 211. After every other count, when counter 211 is incremented from "1" to "0" a carry signal is output by counter 211. This carry signal is output directly at the $CY_i$ output of counter unit 230, and is also "AND"ed with $S_{i+1}$ before being output at the $CX_i$ output.

Referring back to FIG. 5, the operation of address generator 200 will now be described. Following a reset, carry routing register 212 contains "00000001" and counters C10–C0 are all set to zero. The pixel clock increments A2–A0 from 0 to 7, and then back to 0 with a carry sent on the CARRY8 line to the E1 input of C3. Because register 212 is set to "00000001", the SEL input of C3 is 1 and the CARRY8 signal is coupled to the count input of counter C3, which changes from 0 to 1. After the next eight clock cycles, CARRY8 is again asserted, and C3 changes back to 0, and asserts its carry output. As this process repeats, since the other counters C10–C4 have SEL=0, the carries from C3 ripple through until counters C10–C0 all hold ones, which would be after an image band of $2^{11}$ (2048) pixels have been read.

At the next pixel clock cycle (the 2049th cycle, for the first pixel of the next image band), all of the bit counters go to zero, and C10 asserts its CY output. Since $S_{i+1}$ is high for i=10, the CX output of C10 is asserted as well. The CX outputs are each coupled to inputs of OR gate 220 (see FIG. 5), so this applies the carry bit to the ROTATE3 input of register 212. Depending on the DIR input of register 212, the contents of the cells in register 212 are rotated three cells to the left (block-to-raster conversion) or to the right (raster-to-block conversion). Register 212 is circular, in that contents of cells which shift out one end are shifted in the other end. Thus, the contents of carry register 212 for block-to-raster conversion will cycle through the sequences: 00000001, 00001000, 01000000, 00000010, 00010000, 10000000, 00000100, 00100000, and repeat, while the contents of carry register 212 for raster-to-block conversion will cycle through the sequences: 00000001, 00100000, 00000100, 10000000, 00010000, 00000010, 01000000, 00001000, and repeat. In each case, the contents of carry register 212 is constant for one image band and changes in response to the output of OR gate 220 going high.

Logically, counters C10-C0 form an 11-bit counter and output the bits of the numbers 0 through 2047 on address lines A10-A0 in order. "In order" means that A10 is the most significant bit and A0 is the least significant bit, as is conventional with multi-bit counters. After the first image band, however, the least significant bit is in the counter which has SEL=1, and the most significant bit is the bit counter to the right (C10 is effectively "to the right" of C3). Thus, the least through the most significant bits of the $2^8$ counter formed by C10-C3 are rotated by three positions each image band. As explained above, A2-A0 don't change since sets of eight pixels forming one row of a block do not reorder relative to themselves.

A reordering converter for reordering pixels from a raster-to-block order or from a block-to-raster order using an address generator with bit counters with routable carry inputs and outputs and only one band memory has now been described. Such a converter is useful for reordering pixels in images where a block size is 8 pixels wide and 8 pixels high, and where the width of the image is 32 blocks.

This class of address generators is applicable to other cases as well, if fact for any image processing system where the number of blocks/image band (W) and the height of a block in pixels (M) are integer powers of a common base number (P). The general case is $W=P^N$ and $M=P^Q$ for some P, N, and Q, with the width of a block being B pixels. The apparatus of FIGS. 5-7 is easily modified for different values of B, P, N, and Q. For example, in the general case, counter 211 is a modulo-B counter, and outputs a CARRYB signal to the E1 inputs of counter units 230; counter units 230 are modulo-P counters, and the number of counter units 230 is N+Q; a $B \times P^{(N+Q)}$ size band memory is needed; and register 212 is set to rotate by Q cells for each state transition. In some embodiments, Q is programmable, allowing register 212 to be used for different block sizes.

While the embodiment shown in FIGS. 5-7 has just been described for the case where the image band width in blocks and the height of a block are powers of a common base integer, the embodiment shown will work for the same parameters as the first embodiment, namely, where the width of the band is a power of the height of a block (this is equivalent to having Q=1). Furthermore, the first embodiment is also modifiable to accommodate cases where the width of the band is not a power of the height of a block, but they are powers of a common base integer (Q>1; i.e., the class 2 example). Such a modification is done by replacing the circular shift register with a state machine and sufficient multiplexers to provide the same set of routing selection values. For example, if the carry router provides routing selection values S10-S3, as in the example above, these values can be provided by either the circular register shown in FIGS. 5-7, or the equivalent multiplexers and state machine.

Class 3: $B \times M$ pixels/block; $W = M \times N$

This third embodiment of an address generator is used in a reordering converter where the width of the image in blocks, W, is any integer, and a $B \times M \times N$ address memory is used. In such a reordering converter, W is equal to or less than N. A specific example of an address generator for use in a raster-to-block reordering converter with B=8, M=8, W=80, and N=128 (block size of $8 \times 8$ pixels, image band width of 80 blocks, or 640 pixels, and an $8 \times 8 \times 128$, or 8192, address memory) will now be described in conjunction with FIGS. 8-9.

Figure 8:
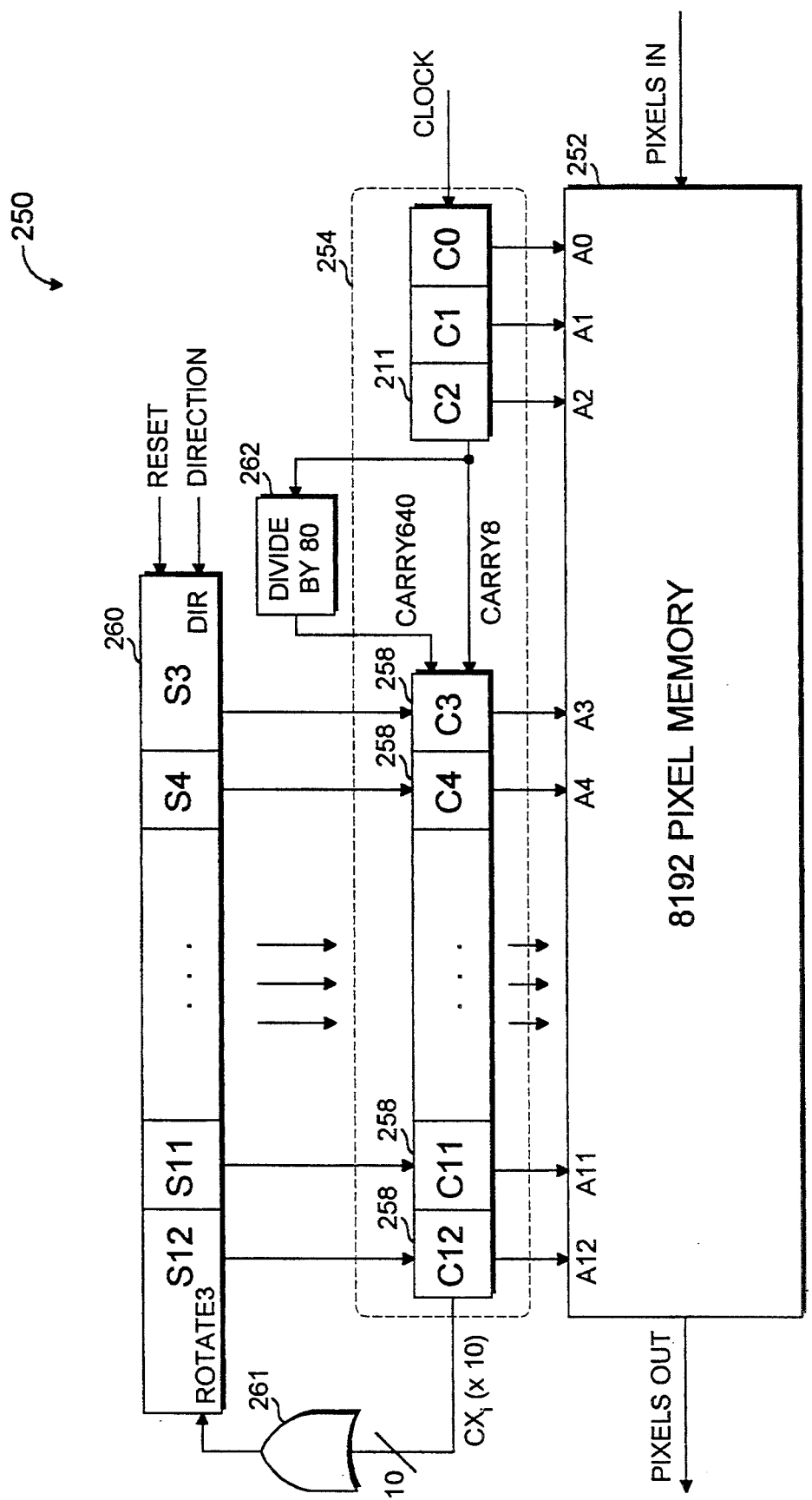
FIG. 8 is a block diagram of a third embodiment of an address generator, including a carry register and a counter array used therein.

FIG. 8 is a block diagram of an address generator 250, as might be used in converter 60 to reorder pixels in image bands with a width of 80 blocks and 8 pixels×8 pixels per block. Address generator 250 is similar to address generator 200, with an additional CARRY640 signal provided to each counter unit 258 (which is similar to counter unit 230, and is shown in detail in FIG. 9). The CARRY640 signal is supplied by a clock divider 262. Clock divider 262 receives the CARRY8 carry signal output by C2 every 8 clock cycles, and outputs a carry on a CARRY640 carry output for each 80 CARRY8 carries input to clock divider 262. The divider number of clock divider 262 is 80, the width of the image in blocks, but for other image widths, the divider number changes accordingly. In some embodiments, clock divider 262 is a programmable divider.

In this example, memory 252 must be large enough to hold a minimum of 80 blocks/band×8 rows/block×8 pixels/row, or 5120 pixels, for one image band. Since memory is typically available only in sizes which are powers of two, when M and B are powers of two, N is also a power of two. A memory of size 8192 would typically be used in the example above, to hold the 5120 pixels.

For easy manipulation of the address lines of memory 252, only the first 640 locations of each 1024 locations are used. If memory 252 is used in this pattern, then an address sequence output for the first image band after a reset might be 0, 1, 2 ... 639, 1024, 1025 ... 1663, 2048 ... 8191. In this example, array 254 is simply configured to output the sequence 0 ... 8191 ($2^{13}=8192$) by connecting the carry inputs of counter units in array 254 to carry outputs of counter units in array 254 in the pattern A12-A11- ... -A4-A3-A2-A1-A0. With the counter units so configured, the only modification needed to the array to provide the skipping sequence is a means for skipping to the end of each 1024 pixel segment when the 640th pixel of that segment is reached. As with address generator 200 (FIG. 5), the address sequences for the second and subsequent image bands are provided by rotating a single "1" around in register 260, i.e., rotating the "significance" of counters C12-C3. The skipping modification must also account for the rotating significance of counters C12-C3.

For the first image band after a reset, carry register 260 contains "00 0000 0001" (spaces inserted for readability) and the counters C12-C3 have a normal significance, with C12 being most significant and C3 being least significant (except for counters 211 A2-A0, whose significance does not change, and is always below that of any of C12-C3). Thus, after 640 pixels are clocked in, counters C12-C0 will contain "00 0101 0000 000" (640 decimal), and the CARRY640 signal will be asserted. Alternatively, the functionality of clock divider 262 could be provided by logic which determines the end of a 640 count by looking at the values of counter outputs in array 254. When the CARRY640 signal is asserted, the values of counters C12-C0 are changed to "00 1000

0000 000" (1024). Likewise, when the count of 1664 ("00 1101 0000 000") is reached, the count is changed to 2048 ("01 0000 0000 000"). The skipping logic which works for each 1024 segment sends a carry signal to the 1024 bit counter, and clear all bits from bit 512 to bit 8. Bits 4, 2, and 1 (A2–A0) are zero at this point, so they don't need to be cleared.

In the example above, with an image width of 80 blocks, counters C3, C4, C5, C6, and C8 also happen to always be zero at this point, but they are cleared nonetheless, since in the general case of widths other than 80, they might not be zero.

Figure 9:
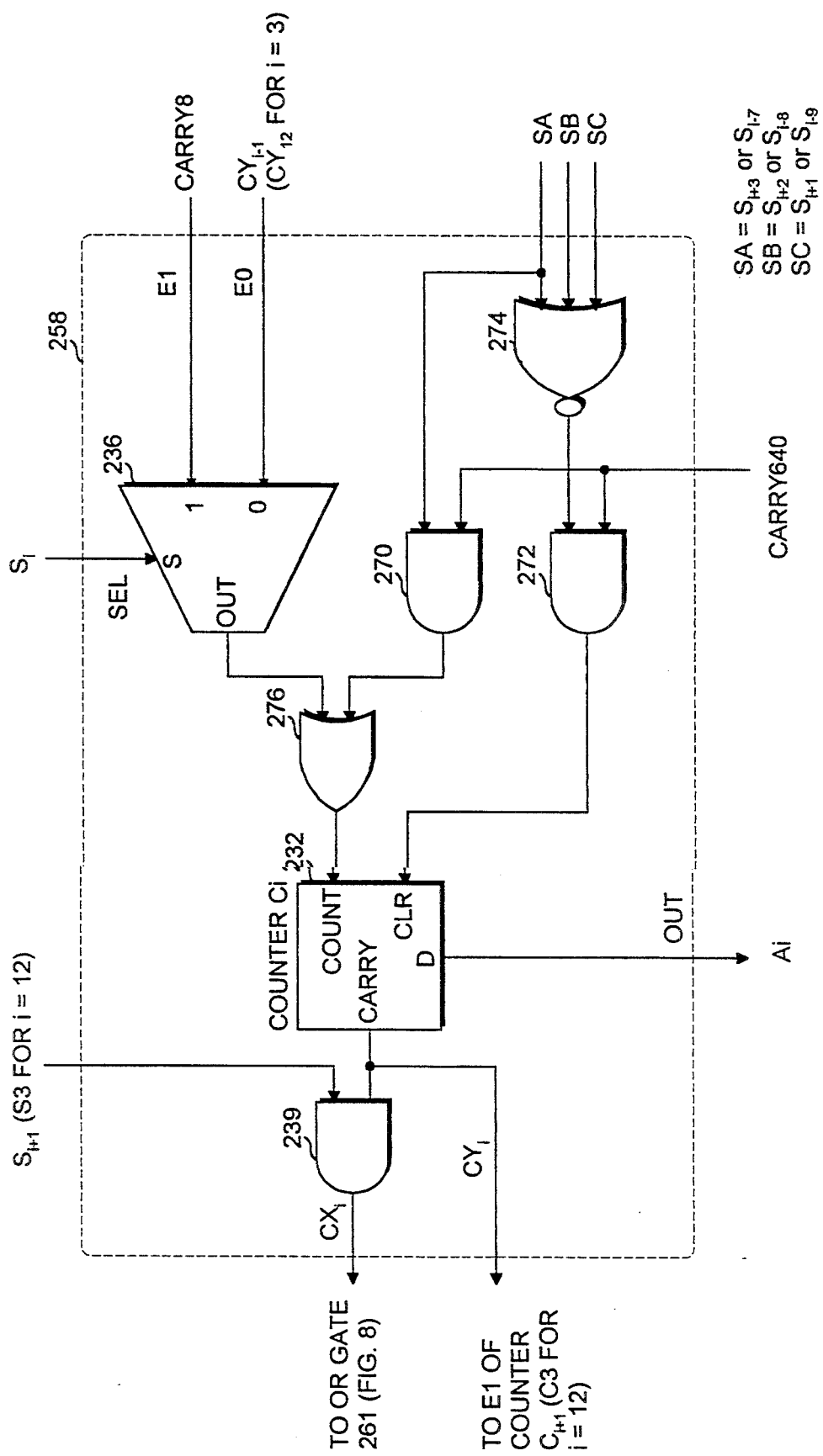
FIG. 9 is a block diagram of one exemplary counter from the counter array shown in FIG. 8, including auxiliary circuitry associated with each counter.

FIG. 9 is a block diagram of the "i"th counter unit 258 from array 254, shown in greater detail. The SEL, E0, E1 inputs and the CX and CY outputs of counter unit 258 function in the same manner as counter unit 230 (shown in FIG. 7), with additional logic provided by two-input AND gates 270, 272, a three-input NOR gate 274, and an OR gate 276. In counter unit 258, instead of the output of multiplexer 236 going directly to the count input of a counter 232, it passes through OR gate 276. A second input of OR gate 276 is coupled to the output of AND gate 270. AND gate 270 "AND"s the CARRY640 signal and an SA input from register 260. The output of AND gate 272 is coupled to the clear input of counter 232 and is the "AND"ing of the CARRY640 signal and the output of NOR gate 274. The inputs of NOR gate 274 are three outputs of register 260, labelled SA (also an input to AND gate 270), SB, and SC. The particular outputs SA, SB, and SC are selected from S12–S3 and differ from counter unit to counter unit. Table 4 shows which outputs of register 260 are the inputs SA, SB, and SC of each counter C12–C3.

TABLE 4

| Register 260 Taps for Counters C12-C3 | | | | | | | | | | |
|---|---|---|---|---|---|---|---|---|---|---|
| | C12 | C11 | C10 | C9 | C8 | C7 | C6 | C5 | C4 | C3 |
| SA | S5 | S4 | S3 | S12 | S11 | S10 | S9 | S8 | S7 | S6 |
| SB | S4 | S3 | S12 | S11 | S10 | S9 | S8 | S7 | S6 | S5 |
| SC | S3 | S12 | S11 | S10 | S9 | S8 | S7 | S6 | S5 | S4 |

The connections shown in Table 4 ensure that after a counter count of 640 in a segment of 1024, the counter array 254 (FIG. 8) skips to the end of the segment, regardless of how the counter significances have been rotated. For example, if S3=1 (state 0), then the inputs to the NOR gates of C12–C3 will be all zero, except for C10 (SA=1), C11 (SB=1), and C12 (SC=1). Because the inputs for all the NOR gates for C9–C3 are zero, the outputs of the C9–C3 NOR gates are 1, which causes counters 232 to be cleared (set to 0) when the CARRY640 signal is asserted. The contents of counters C12–C10 will be unchanged, except that a carry signal will be asserted at the count input of C10, since SA=1 for C10. In effect, the combination of the clear and carry is to zero out bit 512 through bit 1, and increment bit 1024.

When the bit significances are rotated, the logic of counter unit 258 follows the bit significances. For example, when C7 is the most significant bit (the 4096 bit) and C8 is the least significant bit (the 8 bit; A2–A0 are always the 4, 2, and 1 bits), then C6 is the 2048 bit, C5 is the 1024 bit, C4 is the 512 bit, C3 is the 256 bit, C12 is the 128 bit, C11 is the 64 bit, C10 is the 32 bit, and C9 is the 32 bit. In this state, register 260 holds "00 0010 0000", so select line S8=1 and all others (S12–S9, S7–S3) are zero. According to Table 4, the SA, SB, and SC inputs to each counter unit 258 in this state are zero, except for C7 (SC=1), C6 (SB=1), and C5 (SA=1), i.e., the 4096, 2048 and 1024 bits, respectively. AND gates 272, 274 and NOR gate 274, working as expected, clear all but C7–C5, and introduce a carry to C5.

A pixel reordering converter for pixels in image widths of any multiple of the block height, such as eight, has now been described. Variations in the converter will be apparent to those of skill in the art. For example, other block sizes are possible, such as 16×16 pixel blocks, by adding one bit counter 211 to bit counters A2–A0, adding one counter unit 258 to array 254, and one cell to register 260 (see FIG. 8). Other image widths are possible, by modifying the divider ratio of divider clock 262. Multiple widths can be provided with the same circuit, using a programmable divider. If implemented in a width-specific circuit, the memory cells of memory 252 which are not used (i.e., 640–1023, 1664–2047, etc., where the width is 640) need not be provided.

Alternate Embodiment: ROM-based Address Generator

Figure 10:
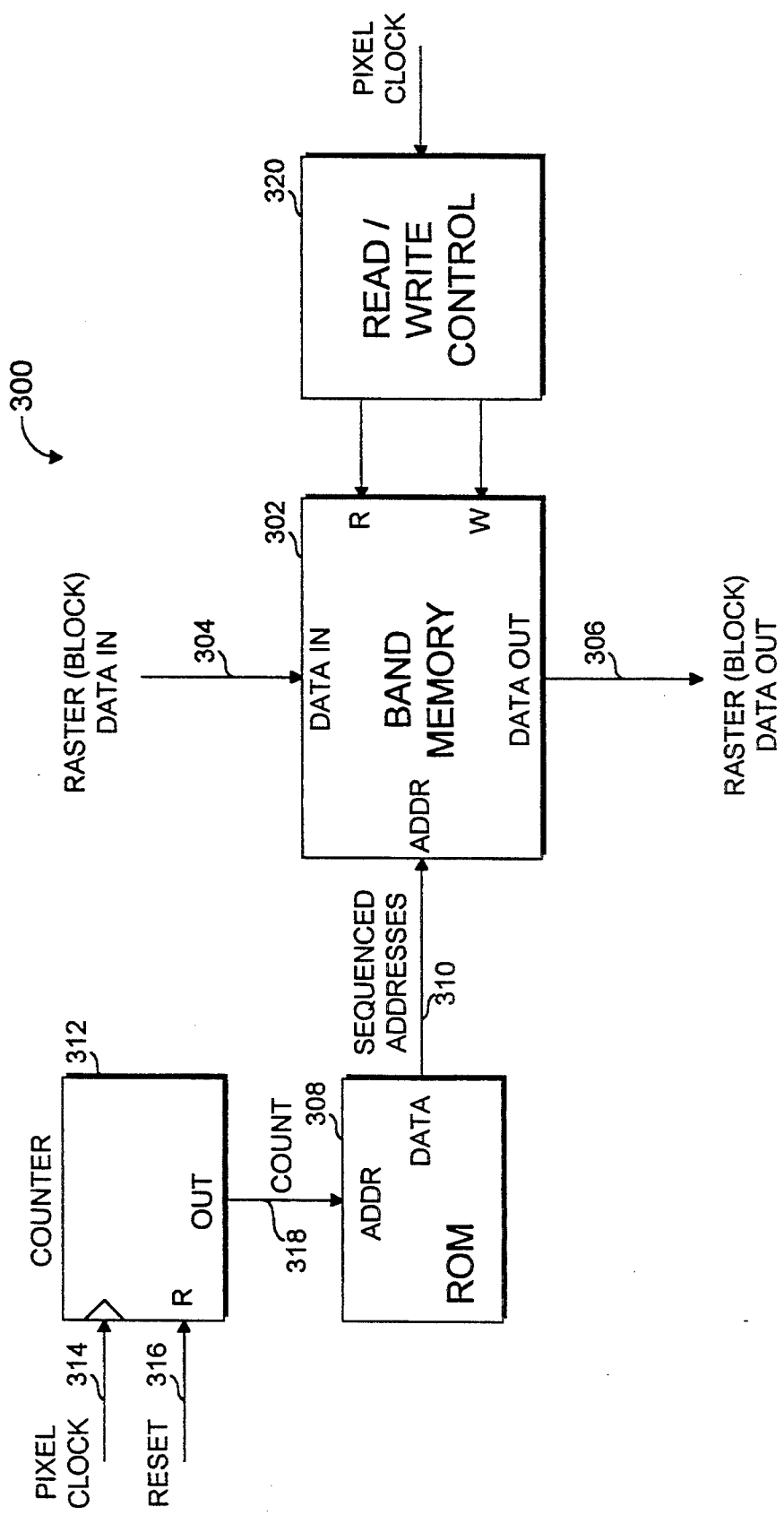
FIG. 10 is a block diagram of an alternate embodiment of an reordering converter according to the present invention, including and address generating ROM.

FIG. 10 shows an alternate embodiment of a reordering converter using a ROM as an address generator. Converter 300 comprises a band memory 302 which receives input pixels on an input bus 304, and outputs output pixels on an output bus 306. An address is supplied to band memory 302 by a read-only memory (ROM) 308 over an address bus 310. A counter 312 is clocked by a pixel clock signal on a clock line 314 and is reset by a signal on a reset line 316. Counter 312 is coupled to an address input of ROM 308 via a bus 318. As with converter 60 (FIG. 2), a read/write control means 320 is provided to ensure that input pixels do not overwrite out-going pixels before the pixels are read out of band memory 302.

Suppose converter 300 is a raster-to-block converter. Initially, input pixels presented to converter 300 are written into sequential locations in memory 302, with counter 312 simply counting up by one each clock cycle. At this point, the data in ROM 308 is such that the input to ROM 308 is also its output to memory 302 (state 0). However, once memory 302 fills, the overwriting of input pixels is more complicated.

Just after memory 302 fills with one image band of pixels, pixels in block order can be output. As they are output in this new state, state 1, in a different order than they were input, the memory locations of the output pixels must be reused, to store incoming pixels. However, this results in the input pixels of the second image band being stored in a different pattern from the first image band.

The necessary address sequences to properly output the stored pixels in the new order are stored in ROM 308 and are output by the action of counter 312 counting up. Counter 312, in the above example, counts to 32767 at the end of the first image band (state 0), and counts 32768 at the first pixel of the second image band (in state 1). Thus, the new pixel order for the second image band is stored in ROM 308 locations starting with 32768. In some embodiments, the contents of ROM 308 are generated by simulating the operation of one of the previously described address generators.

Of course, in some cases, such as 8×8 blocks, the first three bits of the input and the output addresses are the same, so they can be left out of ROM 308, and passed directly from counter 312 to memory 302, requiring only 4096 ROM locations per state.

Color and Subsampling

Figure 11:
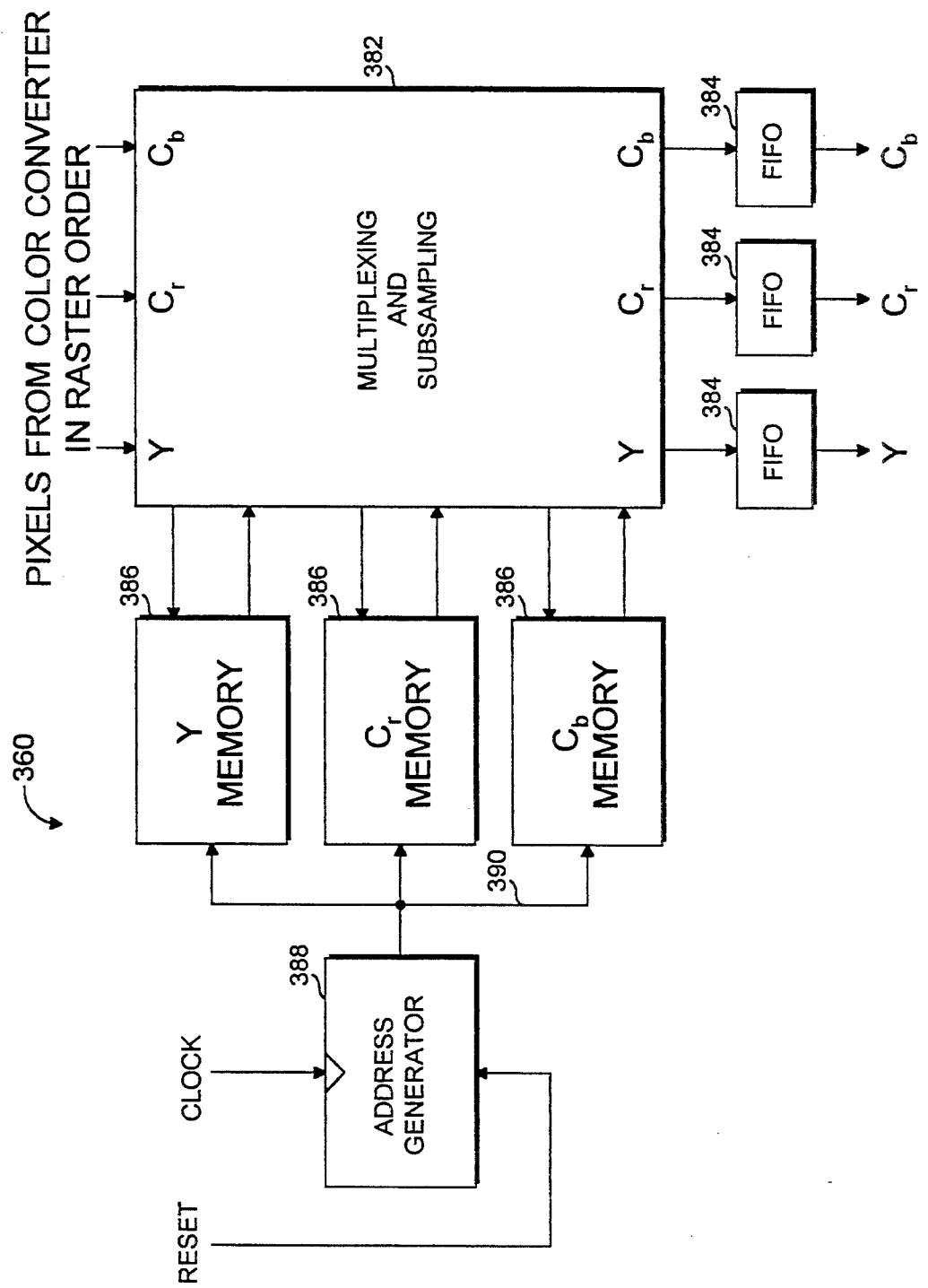
FIG. 11 is a block diagram of an alternate embodiment of a reordering converter according to the present invention for processing pixels containing color components.

FIG. 11 is a block diagram of a raster-to-block converter in a color pixel precompression processing system 380. Processing system 380 comprises multiplexing and subsampling logic 382 for processing pixels as required by the particular needs of the processing system, three first-in first-out (FIFO) memories 384, three reordering memories 386, and an address generator 388. Three input pixel streams (Y, $C_r$, and $C_b$) in raster order are input to logic 382. FIFO memories 384 are coupled to the outputs of logic 382 and buffer three output pixel streams (Y, $C_r$, and $C_b$) output by logic 382 into component blocks where needed. As with address generator 64 (FIG. 2), address generator 388 has a clock input, a reset input, and an address output. The address output of address generator 388 is coupled to the address inputs of the three reordering memories 386, over an address bus 390 which supplies the same address to each reordering memory 386.

In a color pixel processing operation, converter 380 reads three color components of a pixel into logic 382 each clock cycle, processes the three components, and then stores the processed components in memories 386. These components are written to memories 386 in raster order, and by the action of address generator 388, the pixels are written out of memories 386, after a delay, in block order to logic 382, which outputs the pixel, possibly after further processing, to FIFO memories 384. Logic 382 is provided to address the problems associated with subsampled color components.

The operation of address generator 388 is the same as that of address generator 64: each location of a memory is addressed in one sequence in one state, and then in a second sequence in a second state, with all addresses output in each state and the states eventually repeating. One difference between address generator 388 and address generator 64 is that the output of the former controls three reordering memories 386 in parallel, using the single address output. In fact, converter 60 is equivalent to memories 386 and address generator 388, if converter 60 stores the three input color pixels per clock cycle as one value in memory 62.

Logic 382 is slightly more complicated in some embodiments, such as an embodiment which subsamples color components according to a subsampling protocol such as the JPEG standard for 2:1:1 subsampling, where two color pixels are represented by a luminance component for each color pixel and two chrominance components applicable to both color pixels. In the case of 2:1:1 subsampling, the memories 386 used for the $C_r$ and the $C_b$ components can be half the size of the luminance component memory, with the least significant bit (A0) of address generator 388 not being used.

FIFOs 384 are provided to reorder the pixels of the three component streams relative to each other as needed by the particular application. In some applications, logic 382 provides pixels in block order, outputting three components of one pixel each pixel clock cycle, but the image sink (device or process which is the eventual user/recipient of the image) expects to receive a block containing all the first components of pixels in the block, followed by a block of the second component and then a block of the third component. FIFOs 384 provide this ordering. For example, with no subsampling, suppose each pixel comprises a luminance component, a red minus green difference chrominance ($C_r$) component, and a blue minus green difference chrominance ($C_b$) component. Logic 382 outputs, each pixel clock cycle, a luminance component, a $C_r$ component, and a $C_b$ of a pixel in block order. FIFOs 384 buffer the components so that one block's worth of luminance components are output first, followed by one block's worth of $C_r$ components and then one block's worth of $C_b$ components. Instead of processing one pixel per clock, converter 380 could process one component per cycle of a component clock. In such a system, the address generator would still be clocked by the pixel clock. The components for a pixel might be read in simultaneously (parallel input) or one at a time (serial input).

Digital Image Compression/Decompression Systems

Figure 12A:
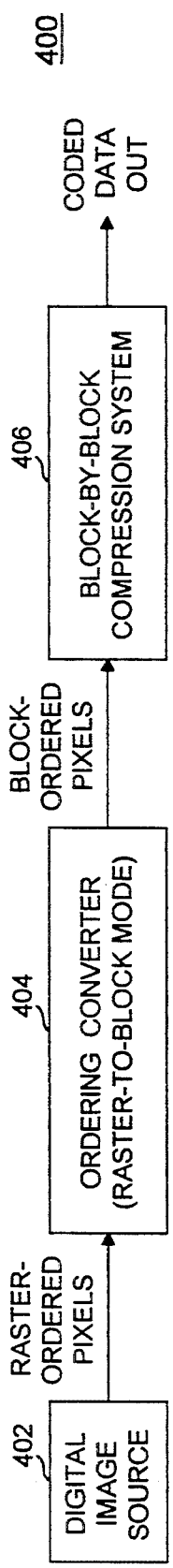
FIG. 12($a$) is a block diagram of a digital image compression system which reorders pixels from a raster order to a block order before compression.

FIG. 12(a) is a block diagram of a digital image compression system 400 which reorders pixels from a raster order to a block order before compression. Image system 400 comprises a digital image source 402, a raster-to-block reordering converter 404, and a block-by-block data compressor 406. Depending on the width of the image in blocks, address generator 100 (FIG. 3), 200 (FIG. 5), 250 (FIG. 8), 300 (FIG. 10), or 380 (FIG. 11) can be used as the address generator for converter 404, which might be similar to converter 60 (FIG. 2). Digital image source 402 provides pixels in raster order, but data compressor 406 operates on pixels in block order. To reorder the pixels, converter 404 is provided between digital image source 402 and data compressor 406. Data compressor 406 outputs the image as coded data, which might be in any of a variety of formats, such as H.261 (CCITT, Specialists Group on Coding for Visual Telephony, Recommendation H.261), JPEG, MPEG, or nascent HDTV standards, etc.

Figure 12B:
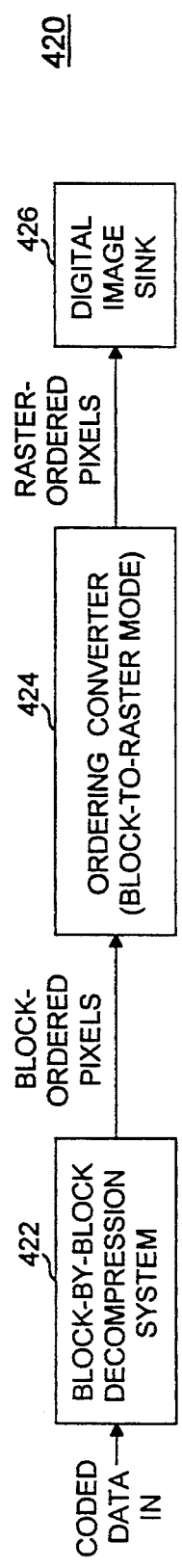

FIG. 12(b) is a block diagram of a digital image decompression system 420 which reorders pixels from a block order to a raster order after decompression, essentially as the inverse of the image compression system of FIG. 12(a). Coded (block-compressed) image data is provided to image decompression system 420 at a block-by-block decompressor 422, and is passed, block by block, to a block-to-raster converter 424, which outputs pixels in raster order to a digital image sink 426. The coded data provided to decompressor 422 might be the coded data output by data compressor 406. Image sink 426, in some embodiments, is a storage means, display means, or other process which uses a raster-ordered pixel stream.

Figure 12C:
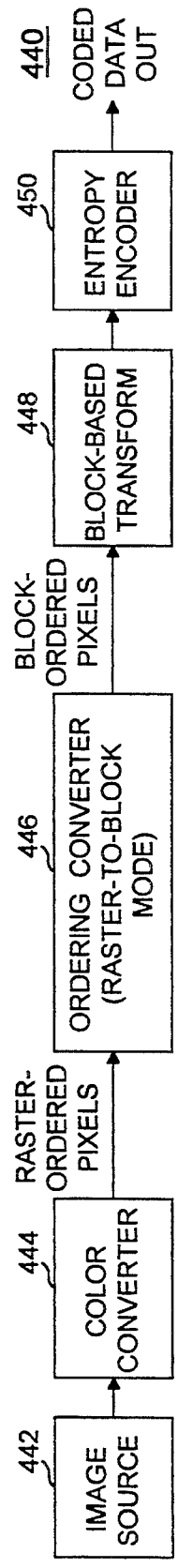

FIG. 12(c) is a block diagram of an alternate embodiment of a digital image compression system 440 which accepts pixels from an image source 442 in raster order, and outputs coded blocks of data representing an image. Compression system 440 comprises image source 442, an optional color converter 444, a raster-to-block converter 446, a block-based transform 448, and an entropy coder 450.

Image source 442 outputs a digital image as a stream of pixels in raster order. The output of image source 442 is coupled to the input of color converter 444 (if used), which transforms the color coordinates of each pixel from one color space to another as required by the design of the particular compression system. If, for example, the pixels provided by image source 442 had color components which were coordinates in the RGB color space, but the output of compression system 440 required pixels with color components in the YUV (Y, $C_r$, $C_b$) color space or the CYMK color space, color converter 444 would perform the necessary conversion on a pixel-by-pixel basis. If the image is a monochrome image, color converter 444 is usually not necessary.

Color converter 444 passes the image, as pixels in raster order, to raster-to-block converter 446, which then outputs the pixels in block order, to block-based transform 448.

Block-based transform 448, in some embodiments, is a discrete cosine transform, which is useful in compressing an image which has more low spatial frequency components in the pixels of a block than high spatial frequency components, as well as other applications. Block-based transform 448 outputs transformed blocks to entropy coder 450, which encodes the transformed data according to conventional entropy coding techniques into coded data blocks.

Figure 12D:
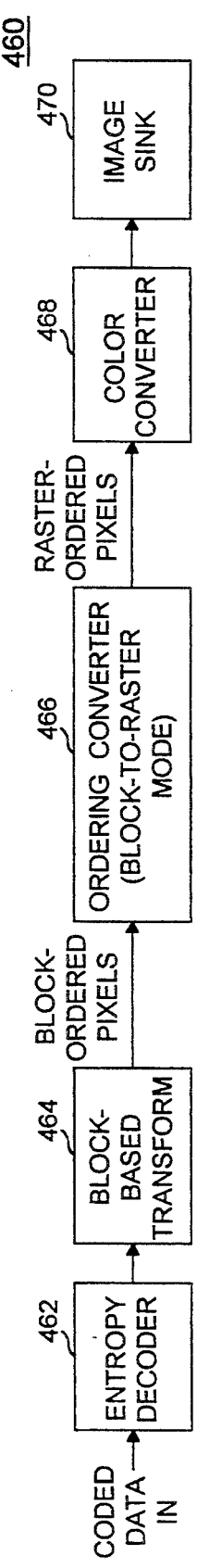

FIG. 12(d) is a block diagram of a digital image decompression system 460 which decodes blocks of coded data into a pixel stream output in raster order, and can be used as the inverse of compression system 440. Decompression system 460 comprises entropy decoder 462, a block-based transform 464, a block-to-raster converter 466, an optional color converter 468, and an image sink 470.

Image data is provided to image decompression system 460 as coded image data blocks, which is typically provided by a system such as compression system 440. The coded image blocks are input to entropy decoder 462, which performs the inverse of entropy coder 450, and outputs image blocks to block-based transform 464. Block-based transform 464 performs the inverse transform of block-based transform 448, and outputs pixels of the image in block order to block-to-raster converter 466. Block-to-raster converter 466 reorders the pixels of the image from a block order to a raster order and outputs the pixels stream to color converter 468. As should be apparent, color converter 468 is optional, and could also be placed before block-to-raster converter 466 in the information stream of decompression system 460. The output of color converter 468, if used, is provided to image sink 470, which is a storage means, display means, or other process which uses a raster-ordered pixel stream.

Preferred embodiments of the invention and the best mode of practicing it have now been described. The above description is illustrative and not restrictive. Many variations of the invention will become apparent to those of skill in the art upon review of this disclosure. Merely by way of example, the converter can be used in non-image applications, where data elements in a stream need to be reordered into another stream and memory is at a premium. Additionally, although the input and output streams of pixels have been described as stream of single pixels, other bus arrangements are possible, such as receiving pixels eight at a time, for example. The scope of the invention should, therefore, be determined not with reference to the above description, but instead should be determined with reference to the appended claims along with their full scope of equivalents.

An Appendix is included, showing source code for a program in the "C" language, in which the functionality of the above reordering converters for class 1 and class 2 are provided in software.

APPENDIX - Software Listings

```
/*****************************************************************
 ,
Routines for performing raster-to-block and block-to-raster
conversion of a monochrome image (raw file, 8-bit pixels with
no header).

Standard routines, using two memories, are shown for
comparison.  Routines using an address generation state
machine according to the present invention are shown for image
widths of 512 blocks and 256 blocks, where a block is 8 x 8
pixels.

Original version written by Ed Schwartz, 14 Sept. 1992.
Modified version written by Ed Schwartz, 22 March 1993.

Copyright 1992, 1993 RICOH Corp.
*****************************************************************/

/* Prior Art conversion routines using two memories include <stdio.h> define    FDIN    0
define    FDOUT   1
#define    _write(x,y,z)    pi_rorw(x, y, z, write, 0)
#define    _read(x,y,z)     pi_rorw(x, y, z, read,  0)
#define    _zread(x,y,z)    pi_rorw(x, y, z, read,  1)

int    write(), read();

int    verbose = C;
```

```
int    image_height;
int    image_width;

/***************************************************************/
/* Standard conversion routines using two memories.            */ raster_to_block_2(inbuff, outbuff, first, last)
    unsigned char *inbuff, *outbuff;
{
    int x,y,b;

if (!last)
        _read(FDIN,inbuff,image_width*8);

/* read in raster order */
    if (!first)
        for (b=0;b<image_width/8;b++)
            for (y=0;y<8;y++)
                for (x=0;x<8;x++)
                    /* write in block order */
                    putchar (outbuff[x+image_width*y+8*b]);
}
block_to_raster_2(inbuff, outbuff, first, last)
    unsigned char *inbuff, *outbuff;
{
    int x,y,b;

if (!last)
        /* read in block order */
        for (b=0;b<image_width/8;b++)
            for (y=0;y<8;y++)
                for (x=0;x<8;x++)
                    inbuff[x+image_width*y+8*b] = getchar ();

if (!first)
        /* write in raster order */
        _write(FDOUT,outbuff,image_width*8);
}

/***************************************************************/
/* Novel routines using a single memory for 512-block wide     */
/* image bands.                                                */ cnt[5] = { 0, 0, 0, 0, 0};

/* Concatenate 4 three-bit counters to one 12 bit address.    */
#define loc (cnt[0]+8*(cnt[1]+8*(cnt[2]+8*cnt[3])))

typedef int next_carry_type[3][4];

next_carry_type c_forward = { { 1, 2, 3, 4},
                              { 3, 2, 4, 1},
                              { 2, 4, 3, 1} };

next_carry_type c_inverse = { { 1, 2, 3, 4},
                              { 2, 4, 3, 1},
                              { 3, 2, 4, 1} };

#define carry_f(j)\
    (forward ? c_forward[cnt[4]][j] : c_inverse[cnt[4]][j])
```

```
raster_to_block_1(buff, first, last)
    unsigned char *buff;
{
    convert_1(buff,first,last,1);
} block_to_raster_1(buff, first, last)
    unsigned char *buff;
{
    convert_1(buff,first,last,0);
} convert_1(buff, first, last, forward)
    unsigned char *buff;
{
    int i;
    int j;
    if (image_width != 512) {
        fprintf (stderr,
            "Error: Only width of 512 supported.\n");
        exit(1);
    } for (i=0;i<image_width*8;i++) {
        if (!first) putchar(buff[loc]);
        if (!last) buff[loc] = getchar();

/* update counter */
        j = 0;
        while (1) {
            if (j < 4)
                cnt[j] = (cnt[j]+1) % 8;
            else
                cnt[j] = (cnt[j]+1) % 3;
            if ((cnt[j] == 0) && (j < 4))
                j = carry_f(j);
            else break;
        }
    }
    /* fprintf (stderr,"end of loop: cnt[4]=%d\n",cnt[4]); */
}

/*************************************************************/
/* Novel routines using a single memory for 256-block wide   */
/* image bands.                                              */

/* Simulate 11 one-bit counters. Uses lastcarry+1 counters. */ cnt2[11] = {0, 0, 0, 0,
            0, 0, 0, 0,
            0, 0, 0 };

int carryfrom2 = 3;   /* 2^3 = 8 */
int size = 8;         /* 2^8 = 256 */
int lastcarry = 10;   /* size + 3 - 1 */ raster_to_block_0(buff, first, last)
    unsigned char *buff;
{
    convert_0(buff,first,last,1);
}
```

```
block_to_raster_0(buff, first, last)
    unsigned char *buff;
{
    convert_0(buff,first,last,0);
}

/* Convert individual one-bit counters to one big counter. */
loc0()
{
    int i;
    int n = 0;
    for (i=lastcarry; i>=0; i--) {
        n *= 2;
        n += cnt2[i];
    }
    return n;
} convert_0(buff, first, last, forward)
    unsigned char *buff;
{
    int i;
    int j;

if (image_width != 256) {
        fprintf (stderr,
            "Error: Only width of 256 supported.\n");
        exit(1);
    }
    for (i=0;i<image_width*8;i++) {
        if (!first) putchar(buff[loc0()]);
        if (!last) buff[loc0()] = getchar();

/* update counter */
        j = 0;
        while (1) {
            if (++cnt2[j] == 1)  /* no carry */
                break;
            cnt2[j] = 0;
            if (j == 2)
                j = carryfrom2;
            else {
                if (j == lastcarry)
                    j = 3;
                else
                    j++;
                if (j == carryfrom2)
                    break;
            }
        }
    }
    carryfrom2 -= 3;
    if (forward)
        carryfrom2 += size - 3;
    else
        carryfrom2 += 3;
    carryfrom2 = (carryfrom2 % size) + 3;
    if (verbose > 0)
        fprintf (stderr,"end of loop: carryfrom2=%d\n",
            carryfrom2);
}
```

```
/***************************************************************/
/* pi_rorw() is a cover routine which reads and writes          */
/* pipes transparently.                                         */ pi_rorw(fd, buf, cnt, func, zflag)
    unsigned char   *buf;
    int (*func)();
    int zflag; /* If zflag=1, allow partial read. */
{
    int acnt, tcnt;

for (acnt = 0; acnt < cnt; acnt += tcnt) {
        tcnt = (*func)(fd, buf, cnt - acnt);
        if (tcnt < 0) {
            perror(func == write ? "write" : "read");
            exit(1);
        }
        buf += tcnt;
        if (tcnt == 0) {
            if (zflag)
                break;
            fprintf(stderr, "pi_rorw: zero\n");
            exit(1);
        }
    }
    return acnt;
} usage()
{
    fprintf(stderr,
        "Usage: convert -f1|-f2|-i1|-i2 width height <in.mono >
            out.mono\n");
    exit(1);
}

/***************************************************************/
main(argc, argv)
    char   *argv[];
{
    int forward;
    int memories;
    unsigned char *buff[2];
    int i, first, last;

if ((argc == 4) && ! strcmp(argv[1], "-f1")) {
        forward = 1;
        memories = 1;
        argc--, argv++;
    }
    else if ((argc == 4) && ! strcmp(argv[1], "-f2")) {
        forward = 1;
        memories = 2;
        argc--, argv++;
    }
    else if ((argc == 4) && ! strcmp(argv[1], "-i1")) {
        forward = 0;
        memories = 1;
        argc--, argv++;
    }
    else if ((argc == 4) && ! strcmp(argv[1], "-i2")) {
        forward = 0;
    memories = 2;
    argc--, argv++;
```

```
}
else usage();

image_width = atoi(argv[1]);
image_height = atoi(argv[2]);

if (image_height % 8 != 0) {
    fprintf(stderr, "Height (%d) is not a multiple of 8.\n",
        image_height);
    exit(1);
}
if ((image_width != 512) && (image_width != 256)
    && (memories == 1)) {
    fprintf(stderr, "Error: Width = %d.  Only widths of 512\
and 256 are supported.\n", image_width);
    exit(1);
} for (i=0;i<memories;i++)
    if (0 == (buff[i]
        = (unsigned char *) malloc (image_width*8))) {
        fprintf (stderr, "block: malloc failed.\n");
        exit(1);
    } if ((memories == 1) && (image_width == 256)) memories = 0;

for (i=0;i<image_height/8+1;i++) {
    first = (i == 0);
    last = (i == image_height/8);
    switch (forward) {
    case 1:
        switch (memories) {
        case 0: raster_to_block_0(buff[0],first,last);
            break;
        case 1: raster_to_block_1(buff[0],first,last);
            break;
        case 2: raster_to_block_2(buff[i%2],buff[1-i%2],
                first,last);
            break;
        }
        break;
    case 0:
        switch (memories) {
        case 0: block_to_raster_0(buff[0],first,last);
            break;
        case 1: block_to_raster_1(buff[0],first,last);
            break;
        case 2: block_to_raster_2(buff[i%2],buff[1-i%2],
                first,last);
            break;
        }
        break;
    }
}
}
/* End of source code. */
``` stream in a second order, where the first and second orders are selected from a raster order and a block order and are not the same order, where a block in the block order is a two-dimensional array of pixels B pixels wide and M pixels high and the image band is a row of W such blocks, where W is an integer power, N, of M, and

What is claimed is:

1. A reordering converter for accepting a first stream of pixels representing a digital image band presented at an input in a first order and outputting the pixels representing the digital image band at an output in a second B, M, N, and W are positive integers, the reordering converter comprising:

a band memory comprising storage for at least W times B times M pixels, said band memory including a pixel input, a pixel output, an address input and a means for retrieving a pixel from a memory location pointed to by an address on said address input, for outputting said retrieved pixel, and for storing a pixel from said pixel input into said memory location pointed to by said address;

a modulo-B counter coupled to a pixel clock and comprising a count output, a carry input and a carry output, wherein said pixel clock is synchronous with pixels in the first stream;

an array of N+1 modulo-M counters, each modulo-M counter comprising a count output, a carry input and a carry output;

an address bus for coupling each count output of said modulo-M counters and said modulo-B counter to said address input of said band memory; and a carry signal router, coupled to said array of modulo-M counters and a carry output of said modulo-B counter, for coupling said carry outputs of said modulo-M counters and said modulo-B counter to selected carry inputs of said modulo-M counters, wherein carry inputs are selected such that an address sequence followed by said modulo-M counters sequences addresses in the first order in a first state and sequences addresses in said second order in a second state following said first state, thereby causing an image band of pixels to be read into said band memory in the first order in said first state and to be output in the second order while reading in a second band of pixels in the first order.

2. The reordering converter of claim 1, wherein said carry signal router comprises:

a plurality of multiplexers, coupled to receive said carry outputs of said modulo-M counters and said modulo-B counter, and output selected carry outputs as carry inputs to said modulo-M counters and a state clock, said selections of said plurality of multiplexers determined by a state value input to selection inputs of said plurality of multiplexers; and a state machine, clocked by said state clock and coupled to said selection inputs, for providing said state value.

3. The reordering converter of claim 2, wherein said state machine counts states in one direction when the first order is the raster order and the second order is the block order, and in an opposite direction when the first order is the block order and the second order is the raster order.

4. The reordering converter of claim 1, where B and M are unequal.

5. The reordering converter of claim 1, wherein each pixel in the digital image band comprises a plurality of color components.

6. The reordering converter of claim 5, wherein said plurality of color components are coordinates in a red-green-blue (RGB) color space.

7. A reordering converter for accepting a first stream of pixels representing a digital image band presented at an input in a first order and outputting the pixels representing the digital image band at an output in a second stream in a second order, where the first and second orders are selected from a raster order and a block order and are not the same order, where a block in the block order is a two-dimensional array of pixels B pixels wide and M pixels high and the image band is a row of W such blocks, where W is an integer power, N, of a base integer, P, where M is an integer power, Q, of the base integer P, and where B, M, N, P, Q and W are positive integers, the reordering converter comprising:

a band memory comprising storage for at least W times B times M pixels, said band memory including a pixel input, a pixel output, an address input and a means for retrieving a pixel from a memory location pointed to by an address on said address input, for outputting said retrieved pixel, and for storing a pixel from said pixel input into said memory location pointed to by said address;

a modulo-B counter coupled to a pixel clock and comprising a count output, a carry input and a carry output, wherein said pixel clock is synchronous with pixels in the first stream;

a circularly-ordered array of N+Q modulo-P counters, each modulo-P counter comprising a count output, a carry input reroutably coupled to a next-lower ordered modulo-P counter, and a carry output reroutably coupled to a next-higher ordered modulo-P counter;

an address bus for coupling each count output of said modulo-P counters and said modulo-B counter to said address input of said band memory; and a carry signal router, coupled to said array of modulo-P counters and a carry output of said modulo-B counter, comprising:

a) means for indicating a present state;

b) means for routing said carry output of said modulo-B counter to said carry input of a selected modulo-P counter, said selection of a modulo-P determined by said present state; and c) means for moving said state machine to a following state when an image band is completely read into said band memory, thereby generating an address sequence at said address input of said band memory such that an image band of pixels read into said band memory in the first order in said present state is output, in said following state, in the second order while a second band of pixels is read in the first order in said following state.

8. The reordering converter of claim 7, wherein said means for moving said state machine to said following state moves said state machine to said following state in response to said carry output of a modulo-P counter which is a next-lower circularly-ordered counter with respect to said selected modulo-P counter.

9. The reordering converter of claim 7, wherein said means for indicating a present state is a circular register comprising N+Q cells, one of which contains a unique value, and said selected modulo-P counter is a modulo-P counter corresponding to said cell containing said unique value.

10. The reordering converter of claim 9, wherein said unique value is one, and each other value in said N+Q cells is zero.

11. The reordering converter of claim 10, said circular register further comprising means for rotating contents of said circular register by Q cells for a state transition from a present state to a following state.

12. The reordering converter of claim 11, said circular register further comprising means for rotating said contents by Q cells in one direction when the first order is the raster order and the second order is the block order, and in an opposite direction when the first order is the block order and the second order is the raster order.

13. A reordering converter for accepting a first stream of pixels representing a digital image band presented at an input in a first order and outputting the pixels representing the digital image band at an output in a second stream in a second order, where the first and second orders are selected from a raster order and a block order and are not the same order, where a block in the block order is a two-dimensional array of pixels B pixels wide and M pixels high and the image band is a row of W such blocks, where W is an integer less than an integer power, N, of a base integer, P, where M is an integer power, Q, of the base integer, and where B, M, N, P, Q and W are positive integers, the reordering converter comprising:

a band memory comprising storage for at least W times B times M pixels, said band memory including a pixel input, a pixel output, an address input and a means for retrieving a pixel from a memory location pointed to by an address on said address input, for outputting said retrieved pixel, and for storing a pixel from said pixel input into said memory location pointed to by said address;

a modulo-B counter coupled to a pixel clock and comprising a count output, a carry input and a carry output, wherein said pixel clock is synchronous with pixels in the first stream;

a circularly-ordered array of N+Q modulo-P counters, each modulo-P counter comprising a count output, a carry input reroutably coupled to a next-lower ordered modulo-P counter, and a carry output reroutably coupled to a next-higher ordered modulo-P counter;

an address bus for coupling each count output of said modulo-P counters and said modulo-B counter to said address input of said band memory;

a carry signal router, coupled to said array of modulo-P counters and a carry output of said modulo-B counter, comprising:
a) means for indicating a present state;
b) means for routing said carry output of said modulo-B counter to said carry input of a selected modulo-P counter, said selection of a modulo-P determined by said present state; and
c) means for moving said state machine to a following state when an image band is completely read into said band memory;

a divider clock synchronized with said pixel clock, where said divider clock outputs a clock cycle every W times B cycles of said pixel clock; and a skipping means, synchronized with said divider clock and coupled to said circularly-ordered array of N+Q modulo-P counters, for adjusting a count in said modulo-P counters, at each clock cycle of said diver clock, to a next highest multiple of P to the Nth power, thereby generating an address sequence at said address input of said band memory such that an image band of W times B times M pixels read into said band memory in the first order in said present state is output, in said following state, in the second order while a second band of pixels is read in the first order in said following state.

14. The reordering converter of claim 13, wherein said band memory comprises storage for at least P to the Nth power times B times M pixels.

15. The reordering converter of claim 13, wherein said divider clock is a divide-by-W clock with a clock input coupled to said carry output of said modulo-B counter.

16. The reordering converter of claim 13, wherein said divider clock is a clock with a clock input coupled to said pixel clock, and wherein said divider clock divides by W times B.

17. The reordering converter of claim 13, wherein said means for moving said state machine to said following state moves said state machine to said following state in response to said carry output of a modulo-P counter which is a next-lower circularly-ordered counter with respect to said selected modulo-P counter.

18. The reordering converter of claim 13, wherein said means for indicating a present state is a circular register comprising N+Q cells, one of which contains a unique value, and said selected modulo-P counter is a modulo-P counter corresponding to said cell containing said unique value.

19. The reordering converter of claim 18, said circular register further comprising means for rotating contents of said circular register by Q cells for a state transition from a present state to a following state.

20. A reordering converter for accepting a first stream of pixels representing a digital image band presented at an input in a first order and outputting the pixels representing the digital image band at an output in a second stream in a second order, where the first and second orders are selected from a raster order and a block order and are not the same order, where a block in the block order is a two-dimensional array of pixels B pixels wide and M pixels high and the image band is a row of W such blocks, where B, M and W are positive integers, the reordering converter comprising:

a band memory comprising storage for at least X times B pixels, where X is W times M, said band memory including a pixel input, a pixel output, an address input and a means for retrieving a pixel from a memory location pointed to by an address on said address input, for outputting said retrieved pixel, and for storing a pixel from said pixel input into said memory location pointed to by said address;

a modulo-B counter coupled to a pixel clock and comprising a count output, a carry input and a carry output, wherein said pixel clock is synchronous with pixels in the first stream;

a sequential counter coupled to said modulo-B counter carry output; and a read-only memory (ROM) coupled at a ROM address input to an output of said sequential counter and coupled at a ROM data output to said address input of said band memory, where said ROM stores a plurality of image segments in order, where an image segments is X ROM locations with X values each sequenced such that a first sequence of values read out of one image segment in the first order and a second sequence of values read out of an adjacent following image segment in the second order are identical sequences.

21. A method for reordering pixels comprising an image band which are received by a reordering converter in a first pixel order and are output by the reordering converter in a second pixel order, where the first pixel order and the second pixel order are different orders selected from a raster order and a block order, the method comprising the steps of:

generating a first address sequence using a multi-stage counter, wherein one stage of said multi-stage counter is clocked synchronously with pixels received by the reordering converter and the remaining stages are clocked by carry outputs of another stage;

applying said first address sequence to an address input of said band memory;

storing each received pixel of a first image band into a location of a band memory addressed by an address from said first address sequence;

rerouting carry signals between said stages of said multi-stage counter;

generating a second address sequence using said multi-stage counter with rerouted carry signals, where said carry signals are rerouted so that said second address sequence addresses pixels stored in said band memory in the second pixel order;

applying said second address sequence to said address input of said band memory;

outputting a pixel of a first image band from a location of a band memory addressed by an address from said second address sequence; and storing a received pixel of a second image band into said location addressed by said address from said second address sequence.

22. The method of claim 21, further comprising the steps of:

rerouting carry signals between said stages of said multi-stage counter after each subsequent image band is stored in said band memory;

generating an address sequence for each subsequent image band using said multi-stage counter with rerouted carry signals, where said carry signals are rerouted so that said address sequence addresses pixels stored in said band memory in the second pixel order;

applying said address sequence to said address input of said band memory;

outputting a pixel of an image band already stored in a location of a band memory addressed by an address from said address sequence; and storing a received pixel of a subsequent image band into said location addressed by said address from said address sequence.

23. The method of claim 21, wherein a block in the block order is a two-dimensional array of pixels B pixels wide and M pixels high and the image band is a row of W such blocks, where W is an integer power, N, of M, and B, M, N, and W are positive integers.

24. The method of claim 23, wherein said steps of generating address sequences comprise the steps of:

indicating, with a modulo-B counter and an array of N+1 modulo-M counters, the position of a pixel within an image band; and rerouting carry inputs and carry outputs of said array of N+1 modulo-M counters, such that the address sequence for one image band is the first order, and the address sequence for a subsequent image band is the second order.

25. The method of claim 21, wherein said step of rerouting carry signals comprises the steps of:

storing a current state;

routing carry outputs to carry inputs based on the current state; and changing said current state to a subsequent state when an image band is completely read into the converter.

26. The method of claim 21, wherein a block in the block order is a two-dimensional array of pixels B pixels wide and M pixels high and the image band is a row of W such blocks, where W is an integer power, N, of a base integer, P, where M is an integer power, Q, of the base integer, and where B, M, N, P, Q and W are positive integers, and wherein said steps of generating address sequences comprise the steps of:

indicating, with a modulo-B counter and an array of N+Q modulo-P counters, the position of a pixel within an image band;

ordering said modulo-P counters in a ring with each modulo-P counter having two neighboring modulo-P counters and coupled to receive a carry output signal from one neighboring modulo-P counter and coupled to output a carry signal to an input of the other neighboring modulo-P counter; and rerouting one carry input and one carry output of a pair of neighboring modulo-P counters, such that the address sequence for one image band is the first order, and the address sequence for a subsequent image band is the second order.

27. The method of claim 21, wherein a block in the block order is a two-dimensional array of pixels B pixels wide and M pixels high and the image band is a row of W such blocks, where W is an integer less than an integer power, N, of a base integer, P, where M is an integer power, Q, of the base integer, and where B, M, N, P, Q and W are positive integers.

28. The method of claim 27, wherein said steps of generating address sequences comprise the steps of:

indicating, with a modulo-B counter and an array of N+Q modulo-P counters, the position of a pixel within an image band;

ordering said modulo-P counters in a ring with each modulo-P counter having two neighboring modulo-P counters and coupled to receive a carry output signal from one neighboring modulo-P counter and coupled to output a carry signal to an input of the other neighboring modulo-P counter;

skipping addresses in each segment of B times $P^N$ pixels, such that B times W addresses are output for each segment; and rerouting one carry input and one carry output of a pair of neighboring modulo-P counters, such that the address sequence for one image band is the first order, and the address sequence for a subsequent image band is the second order.

* * * * *

UNITED STATES PATENT AND TRADEMARK OFFICE
CERTIFICATE OF CORRECTION

PATENT NO. : 5,446,560
DATED : August 29, 1995
INVENTOR(S) : Edward L. Schwartz

It is certified that error appears in the above-indentified patent and that said Letters Patent is hereby corrected as shown below:

At Col. 2, line 51, replace "an" with --a--;
At Col. 2, line 52, delete "a";
At Col. 2, line 55, replace "are" with --is--;
At Col. 5, line 8, replace "an" with --a--;
At Col. 5, line 9, replace "and" with --an--;
At Col 5, line 47, replace "by" with --be--;
At Col. 5, line 55, replace "breath" with --breadth--;
At Col 6, line 46, replace "an" with --a--;
At Col. 13, line 34, replace "if" with --in--,
At Col. 15, line 5, replace "clear" with --clears--:
At Col. 19, line 23, replace "is" with --are--;
At Col. 20, line 3, replace "pixels" with --pixel--
At Col. 34, line 56, replace "segments" with --segment--;

UNITED STATES PATENT AND TRADEMARK OFFICE
CERTIFICATE OF CORRECTION

PATENT NO. : 5,446,560
DATED : August 29, 1995
INVENTOR(S) : Edward L. Schwartz

It is certified that error appears in the above-indentified patent and that said Letters Patent is hereby corrected as shown below:

At Col. 6, line 15, replace "$W=p^N$" with --$W=P^N$--;
At Col. 8, line 11, replace "$A_{14}$ to $A_0$" with --A14 to A0--;
At Col. 8, line 15, replace "$A_{14}-A_0$" with --A14-A0--;
At Col. 8, line 30, replace "$A_{14}-A_0$" with --A14-A0--;
At Col. 8, line 31, replace "$A_{14}$" with --A14--;
At Col. 11, line 43, replace "$S_{10}-S_3$" with --S10-S3--
reverse the order of the columns 29 and 30 following the Appendix.

Signed and Sealed this

Tenth Day of September, 1996

*Attest:*

BRUCE LEHMAN

*Attesting Officer*   Commissioner of Patents and Trademarks